United States Patent
Kim et al.

(10) Patent No.: US 10,849,062 B2
(45) Date of Patent: Nov. 24, 2020

(54) METHOD FOR OPERATING IN POWER-SAVE MODE IN WIRELESS LAN SYSTEM AND APPARATUS FOR METHOD

(71) Applicant: LG ELECTRONICS INC., Seoul (KR)

(72) Inventors: Jeongki Kim, Seoul (KR); Kiseon Ryu, Seoul (KR); Hangyu Cho, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 15/771,658

(22) PCT Filed: Nov. 18, 2016

(86) PCT No.: PCT/KR2016/013325
§ 371 (c)(1),
(2) Date: Apr. 27, 2018

(87) PCT Pub. No.: WO2017/086731
PCT Pub. Date: May 26, 2017

(65) Prior Publication Data
US 2018/0332529 A1 Nov. 15, 2018

Related U.S. Application Data

(60) Provisional application No. 62/257,236, filed on Nov. 19, 2015, provisional application No. 62/257,727, (Continued)

(51) Int. Cl.
*H04W 52/02* (2009.01)
*G06F 1/32* (2019.01)
(Continued)

(52) U.S. Cl.
CPC ...... *H04W 52/0206* (2013.01); *G06F 1/3209* (2013.01); *G06F 1/3287* (2013.01);
(Continued)

(58) Field of Classification Search
None
See application file for complete search history.

(56) References Cited

U.S. PATENT DOCUMENTS 10,045,340 B1 * 8/2018 Chu .................. H04W 24/10
2011/0122780 A1   5/2011 Nieminen et al.
(Continued)

FOREIGN PATENT DOCUMENTS

KR   1020130105709   9/2013
KR   1020130133275   12/2013
(Continued)

OTHER PUBLICATIONS

PCT International Application No. PCT/KR2016/013325, Written Opinion of the International Searching Authority dated Feb. 17, 2017, 17 pages.
(Continued)

*Primary Examiner* — Ruihua Zhang
(74) *Attorney, Agent, or Firm* — Lee Hong Degerman Kang Waimey

(57) ABSTRACT

A station (STA) and method for operating the STA in a power-save (PS) mode in a wireless LAN system, the method including: receiving a physical layer protocol data unit (PPDU); decoding at least a part of the PPDU; and operating in a doze state until the end of the PPDU on the basis of the result of decoding at least a part of the PPDU, wherein if the PPDU comprises an aggregate MAC protocol data unit (A-MPDU), then the STA can determine whether to operate in a doze state by considering whether any one from among a receiver address (RA) or a transmitter address
(Continued)

(TA) included in the A-MPDU matches the BSSID of a basic service set (BSS) associated with the STA.

10 Claims, 20 Drawing Sheets

Related U.S. Application Data filed on Nov. 20, 2015, provisional application No. 62/258,552, filed on Nov. 23, 2015, provisional application No. 62/260,228, filed on Nov. 25, 2015.

(51) Int. Cl.
*G06F 1/3287* (2019.01)
*G06F 1/3209* (2019.01)
*H04B 7/26* (2006.01)
*H04W 84/12* (2009.01)

(52) U.S. Cl.
CPC .......... *H04B 7/2612* (2013.01); *H04W 52/02* (2013.01); *H04W 52/0216* (2013.01); *H04W 52/0238* (2013.01); *H04W 84/12* (2013.01); *Y02D 70/00* (2018.01); *Y02D 70/14* (2018.01)

(56) References Cited

U.S. PATENT DOCUMENTS

| | | |
|---|---|---|
| 2012/0044925 A1 | 2/2012 | Lee et al. |
| 2013/0010664 A1 | 1/2013 | Kang et al. |
| 2014/0029597 A1 | 1/2014 | Chu et al. |
| 2015/0117343 A1 | 4/2015 | Xing et al. |
| 2016/0044533 A1 | 2/2016 | Seok |
| 2016/0242070 A1* | 8/2016 | Asterjadhi ............ H04L 5/0055 |
| 2016/0302229 A1* | 10/2016 | Hedayat .............. H04L 12/1868 |
| 2017/0111875 A1* | 4/2017 | Azizi .................. H04W 56/001 |
| 2017/0289987 A1* | 10/2017 | Seok ..................... H04W 84/12 |

FOREIGN PATENT DOCUMENTS

| | | |
|---|---|---|
| KR | 1020140023851 | 2/2014 |
| KR | 1020140037892 | 3/2014 |
| WO | 2013008989 | 1/2013 |
| WO | 2015093792 | 6/2015 |
| WO | 2015105390 | 7/2015 |

OTHER PUBLICATIONS

PCT International Application No. PCT/KR2016/013324, Written Opinion of the International Searching Authority dated Feb. 17, 2017, 15 pages.

U.S. Appl. No. 15/769,702, Office Action dated Apr. 25, 2019, 18 pages.

Valerio, D. et al., "Using IEEE 802.11 for Wide Area Networks: Potential Enhancements," ftw. Technical Report, Jul. 2006, 30 pages.

* cited by examiner

FIG. 11

| L-STF | L-LTF | L-SIG | VHT-SIG A | VHT-STF | VHT-LTF | VHT-SIG B | Data |
|---|---|---|---|---|---|---|---|
| 8us | 8us | 4us | 8us | 4us | 4us per VHT-LTF symbol | 4us | |

METHOD FOR OPERATING IN POWER-SAVE MODE IN WIRELESS LAN SYSTEM AND APPARATUS FOR METHOD

TECHNICAL FIELD

The present invention relates to a wireless LAN system, and more particularly, to a method for operating STA in a PS mode on the basis of a received frame and an apparatus therefor.

BACKGROUND ART

Standards for Wireless Local Area Network (WLAN) technology have been developed as Institute of Electrical and Electronics Engineers (IEEE) 802.11 standards. IEEE 802.11a and b use an unlicensed band at 2.4 GHz or 5 GHz. IEEE 802.11b provides a transmission rate of 11 Mbps and IEEE 802.11a provides a transmission rate of 54 Mbps. IEEE 802.11g provides a transmission rate of 54 Mbps by applying Orthogonal Frequency Division Multiplexing (OFDM) at 2.4 GHz. IEEE 802.11n provides a transmission rate of 300 Mbps for four spatial streams by applying Multiple Input Multiple Output (MIMO)-OFDM. IEEE 802.11n supports a channel bandwidth of up to 40 MHz and, in this case, provides a transmission rate of 600 Mbps.

The above-described WLAN standards have evolved into IEEE 802.11ac that uses a bandwidth of up to 160 MHz and supports a transmission rate of up to 1 Gbits/s for 8 spatial streams and IEEE 802.11ax standards are under discussion.

DISCLOSURE

Technical Problem

An object of the present invention is to provide a method for performing a power-save operation for Intra-BSS PPDU in an STA of a wireless LAN system more exactly and efficiently and an apparatus therefor.

It will be appreciated by persons skilled in the art that the object that can be achieved with the present invention are not limited to what has been particularly described hereinabove and other objects of the present invention will be more clearly understood from the following detailed description taken in conjunction with the accompanying drawings.

Technical Solution

According to one aspect of the present invention to achieve the aforementioned object, a method for a station (STA) operating in a power-save (PS) mode in a wireless LAN system comprises receiving a physical layer protocol data unit (PPDU); decoding at least a part of the PPDU; and operating in a doze state until the end of the PPDU on the basis of the result of decoding the at least a part of the PPDU, wherein if the PPDU comprises an aggregate MAC protocol data unit (A-MPDU), the STA determines whether to operate in the doze state considering whether a receiver address (RA) or a transmitter address (TA) included in the A-MPDU is identical with a BSSID of a basic service set (BSS) with which the STA is associated.

According to another aspect of the present invention to achieve the aforementioned object, a station (STA) operating in a power save (PS) mode in a wireless LAN system comprises a receiver for receiving a PPDU (physical layer protocol data unit); and a processor for decoding at least a part of the PPDU and controlling the STA to operate in a doze state until the end of the PPDU on the basis of the result of decoding at least a part of the PPDU, wherein if the PPDU includes A-MPDU (aggregate MAC protocol data unit), the processor determines whether to operate in the doze state considering whether a receiver address (RA) or a transmitter address (TA) included in the A-MPDU is identical with BSSID of a basic service set (BSS) with which the STA is associated.

If the RA or the TA included in the A-MPDU is identical with the BSSID of the BSS with which the STA is associated and the RA is not a MAC address of the STA, the STA may operate in the doze state until the end of the PPDU.

Also, if the TA included in the A-MPDU is identical with the BSSID of the BSS with which the STA is associated and the RA is identical with a MAC address of the STA, the STA may maintain an awake state.

Also, the STA may continue to operate a network allocation vector (NAV) timer while the STA is operating in the doze state, and may be switched to an awake state at the end of the PPDU.

Also, the RA and the TA may be included in a MAC header of each of a plurality of MPDUs included in the A-MPDU.

Also, the STA may identify the RA or the TA included in the A-MPDU by decoding any one of the MPDUs.

Also, the STA may decode MPDU located at the forefront among the MPDUs, and may operate in the doze state for a duration of the other MPDUs.

Advantageous Effects

According to one embodiment of the present invention, an STA in a wireless LAN system can operate in a doze state until the end of a PPDU considering a BSS which has transmitted the PPDU and/or a receiver of the PPDU, whereby a power can be managed more exactly and efficiently than the case that the STA receives Intra-BSS PPDU.

It will be appreciated by persons skilled in the art that the effects that can be achieved with the present invention are not limited to what has been particularly described hereinabove and other effects of the present invention will be more clearly understood from the following detailed description taken in conjunction with the accompanying drawings.

BRIEF DESCRIPTION OF THE DRAWINGS

FIG. 11 illustrates an example of VHT PPDU.

MODE FOR INVENTION

Reference will now be made in detail to the exemplary embodiments of the present invention, examples of which are illustrated in the accompanying drawings. The detailed description, which will be given below with reference to the accompanying drawings, is intended to explain exemplary embodiments of the present invention, rather than to show the only embodiments that can be implemented according to the present invention.

The following detailed description includes specific details in order to provide a thorough understanding of the present invention. However, it will be apparent to those skilled in the art that the present invention may be practiced without such specific details. In some instances, known structures and devices are omitted or are shown in block diagram form, focusing on important features of the structures and devices, so as not to obscure the concept of the present invention.

As described before, the following description is given of a method and apparatus for increasing a spatial reuse rate in a Wireless Local Area Network (WLAN) system. To do so, a WLAN system to which the present invention is applied will first be described in detail.

Figure 1:
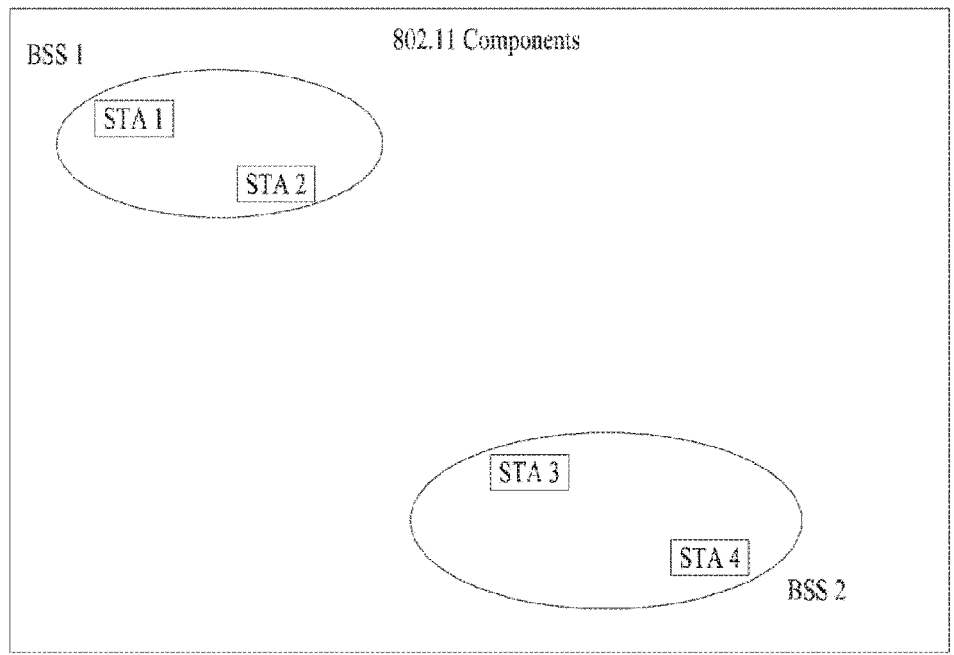
FIG. 1 illustrates an example of a configuration of a wireless LAN system.

FIG. 1 is a diagram illustrating an exemplary configuration of a WLAN system.

As illustrated in FIG. 1, the WLAN system includes at least one Basic Service Set (BSS). The BSS is a set of STAs that are able to communicate with each other by successfully performing synchronization.

An STA is a logical entity including a physical layer interface between a Media Access Control (MAC) layer and a wireless medium. The STA may include an AP and a non-AP STA. Among STAs, a portable terminal manipulated by a user is the non-AP STA. If a terminal is simply called an STA, the STA refers to the non-AP STA. The non-AP STA may also be referred to as a terminal, a Wireless Transmit/Receive Unit (WTRU), a User Equipment (UE), a Mobile Station (MS), a mobile terminal, or a mobile subscriber unit.

The AP is an entity that provides access to a Distribution System (DS) to an associated STA through a wireless medium. The AP may also be referred to as a centralized controller, a Base Station (BS), a Node-B, a Base Transceiver System (BTS), or a site controller.

The BSS may be divided into an infrastructure BSS and an Independent BSS (IBSS).

The BSS illustrated in FIG. 1 is the IBSS. The IBSS refers to a BSS that does not include an AP. Since the IBSS does not include the AP, the IBSS is not allowed to access to the DS and thus forms a self-contained network.

Figure 2:
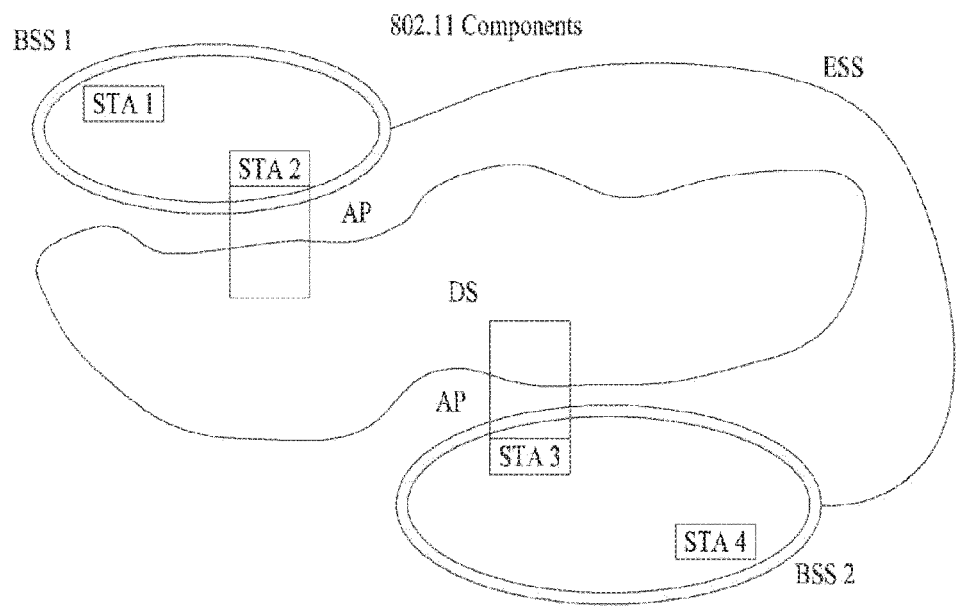
FIG. 2 illustrates another example of a configuration of a wireless LAN system.

FIG. 2 is a diagram illustrating another exemplary configuration of a WLAN system.

BSSs illustrated in FIG. 2 are infrastructure BSSs. Each infrastructure BSS includes one or more STAs and one or more APs. In the infrastructure BSS, communication between non-AP STAs is basically conducted via an AP. However, if a direct link is established between the non-AP STAs, direct communication between the non-AP STAs may be performed.

As illustrated in FIG. 2, the multiple infrastructure BSSs may be interconnected via a DS. The BSSs interconnected via the DS are called an Extended Service Set (ESS). STAs included in the ESS may communicate with each other and a non-AP STA within the same ESS may move from one BSS to another BSS while seamlessly performing communication.

The DS is a mechanism that connects a plurality of APs to one another. The DS is not necessarily a network. As long as it provides a distribution service, the DS is not limited to any specific form. For example, the DS may be a wireless network such as a mesh network or may be a physical structure that connects APs to one another.

Layer Architecture

An operation of a STA in a WLAN system may be described from the perspective of a layer architecture. A processor may implement the layer architecture in terms of device configuration. The STA may have a plurality of layers. For example, the 802.11 standards mainly deal with a MAC sublayer and a PHY layer on a Data Link Layer (DLL). The PHY layer may include a Physical Layer Convergence Protocol (PLCP) entity, a Physical Medium Dependent (PMD) entity, and the like. Each of the MAC sublayer and the PHY layer conceptually includes management entities called MAC sublayer Management Entity (MLME) and Physical Layer Management Entity (PLME). These entities provide layer management service interfaces through which a layer management function is executed.

To provide a correct MAC operation, a Station Management Entity (SME) resides in each STA. The SME is a layer independent entity which may be perceived as being present in a separate management plane or as being off to the side. While specific functions of the SME are not described in detail herein, the SME may be responsible for collecting layer-dependent states from various Layer Management Entities (LMEs) and setting layer-specific parameters to similar values. The SME may execute these functions and implement a standard management protocol on behalf of general system management entities.

The above-described entities interact with one another in various manners. For example, the entities may interact with one another by exchanging GET/SET primitives between them, A primitive refers to a set of elements or parameters related to a specific purpose. An XX-GET request primitive is used to request a predetermined MIB attribute value (management information-based attribute information). An XX-GET.confirm primitive is used to return an appropriate MIB attribute information value when the Status field indicates "Success" and to return an error indication in the Status field when the Status field does not indicate "Success". An XX-SET.request primitive is used to request setting of an indicated MIB attribute to a predetermined value. When the MIB attribute indicates a specific operation, the MIB attribute requests the specific operation to be performed. An XX-SET.confirm primitive is used to confirm that the indicated MIB attribute has been set to a requested value when the Status field indicates "Success" and to return an error condition in the Status field when the Status field does not indicate "Success". When the MIB attribute indicates a specific operation, it confirms that the operation has been performed.

Also, the MLME and the SME may exchange various MLME_GET/SET primitives through an MLME Service Access Point (MLME_SAP). In addition, various PLME_GET/SET primitives may be exchanged between the PLME and the SME through a PLME_SAP, and exchanged between the MLME and the PLME through an MLME-PLME_SAP.

Link Setup Process

Figure 3:
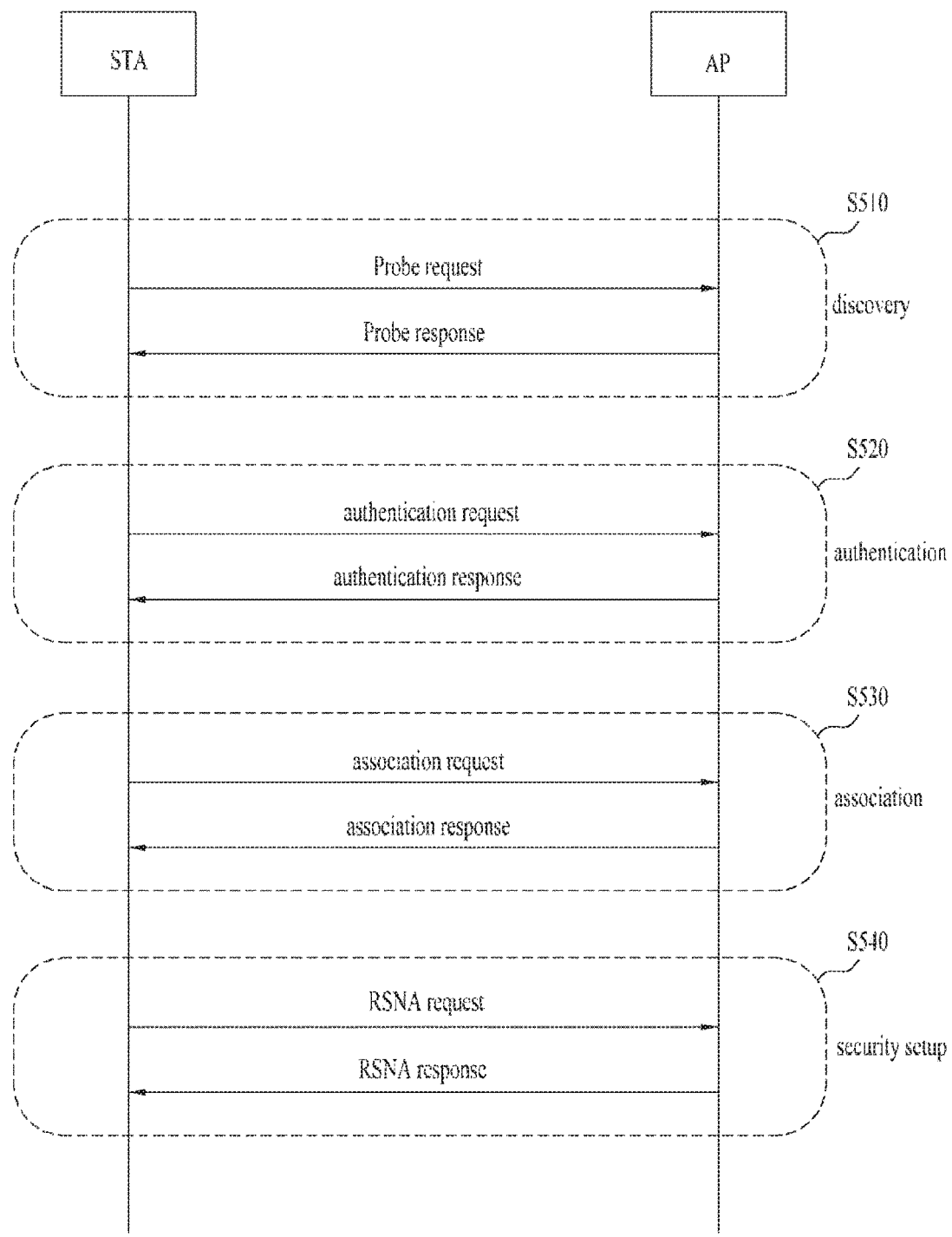
FIG. 3 illustrates a general link setup procedure.

FIG. 3 is a flowchart explaining a general link setup process according to an exemplary embodiment of the present invention.

In order to allow a STA to establish link setup on the network as well as to transmit/receive data over the network, the STA must perform such link setup through processes of network discovery, authentication, and association, and must establish association and perform security authentication. The link setup process may also be referred to as a session initiation process or a session setup process. In addition, an association step is a generic term for discovery, authentication, association, and security setup steps of the link setup process.

Link setup process is described referring to FIG. 3.

In step S510, STA may perform the network discovery action. The network discovery action may include the STA scanning action. That is, STA must search for an available network so as to access the network. The STA must identify a compatible network before participating in a wireless network. Here, the process for identifying the network contained in a specific region is referred to as a scanning process.

The scanning scheme is classified into active scanning and passive scanning.

FIG. 3 is a flowchart illustrating a network discovery action including an active scanning process. In the case of the active scanning, a STA configured to perform scanning transmits a probe request frame and waits for a response to the probe request frame, such that the STA can move between channels and at the same time can determine which Access Point (AP) is present in a peripheral region. A responder transmits a probe response frame, acting as a response to the probe request frame, to the STA having transmitted the probe request frame. In this case, the responder may be a STA that has finally transmitted a beacon frame in a BSS of the scanned channel. In BSS, since the AP transmits the beacon frame, the AP operates as a responder. In IBSS, since STAs of the IBSS sequentially transmit the beacon frame, the responder is not constant. For example, the STA, that has transmitted the probe request frame at Channel #1 and has received the probe response frame at Channel #1, stores BSS-associated information contained in the received probe response frame, and moves to the next channel (for example, Channel #2), such that the STA may perform scanning using the same method (i.e., probe request/response transmission/reception at Channel #2).

Although not shown in FIG. 3, the scanning action may also be carried out using passive scanning. A STA configured to perform scanning in the passive scanning mode waits for a beacon frame while simultaneously moving from one channel to another channel. The beacon frame is one of management frames in IEEE 802.11, indicates the presence of a wireless network, enables the STA performing scanning to search for the wireless network, and is periodically transmitted in a manner that the STA can participate in the wireless network. In BSS, the AP is configured to periodically transmit the beacon frame. In IBSS, STAs of the IBSS are configured to sequentially transmit the beacon frame. If each STA for scanning receives the beacon frame, the STA stores BSS information contained in the beacon frame, and moves to another channel and records beacon frame information at each channel. The STA having received the beacon frame stores BSS-associated information contained in the received beacon frame, moves to the next channel, and thus performs scanning using the same method.

In comparison between the active scanning and the passive scanning, the active scanning is more advantageous than the passive scanning in terms of delay and power consumption.

After the STA discovers the network, the STA may perform the authentication process in step S520. The authentication process may be referred to as a first authentication process in such a manner that the authentication process can be clearly distinguished from the security setup process of step S540.

The authentication process may include transmitting an authentication request frame to an AP by the STA, and transmitting an authentication response frame to the STA by the AP in response to the authentication request frame. The authentication frame used for authentication request/response may correspond to a management frame.

The authentication frame may include an authentication algorithm number, an authentication transaction sequence number, a state code, a challenge text, a Robust Security Network (RSN), a Finite Cyclic Group (FCG), etc. The above-mentioned information contained in the authentication frame may correspond to some parts of information capable of being contained in the authentication request/response frame, may be replaced with other information, or may include additional information.

The STA may transmit the authentication request frame to the AP. The AP may decide whether to authenticate the corresponding STA on the basis of information contained in the received authentication request frame. The AP may provide the authentication result to the STA through the authentication response frame.

After the STA has been successfully authenticated, the association process may be carried out in step S530. The association process may involve transmitting an association request frame to the AP by the STA, and transmitting an association response frame to the STA by the AP in response to the association request frame.

For example, the association request frame may include information associated with various capabilities, a beacon listen interval, a Service Set Identifier (SSID), supported rates, supported channels, RSN, mobility domain, supported operating classes, a TIM (Traffic Indication Map) broadcast request, interworking service capability, etc.

For example, the association response frame may include information associated with various capabilities, a state code, an Association ID (AID), supported rates, an Enhanced Distributed Channel Access (EDCA) parameter set, a Received Channel Power Indicator (RCPI), a Received Signal to Noise Indicator (RSNI), mobility domain, a timeout interval (association comeback time), an overlapping BSS scan parameter, a TIM broadcast response, a Quality of Service (QoS) map, etc.

The above-mentioned information may correspond to some parts of information capable of being contained in the association request/response frame, may be replaced with other information, or may include additional information.

After the STA has been successfully associated with the network, a security setup process may be carried out in step S540. The security setup process of Step S540 may be referred to as an authentication process based on Robust Security Network Association (RSNA) request/response. The authentication process of step S520 may be referred to as a first authentication process, and the security setup process of Step S540 may also be simply referred to as an authentication process.

For example, the security setup process of Step S540 may include a private key setup process through 4-way handshaking based on an Extensible Authentication Protocol over LAN (EAPOL) frame. In addition, the security setup process may also be carried out according to other security schemes not defined in IEEE 802.11 standards.

Medium Access Mechanism

In the IEEE 802.11-based WLAN system, a basic access mechanism of Medium Access Control (MAC) is a Carrier Sense Multiple Access with Collision Avoidance (CSMA/CA) mechanism. The CSMA/CA mechanism is referred to as a Distributed Coordination Function (DCF) of IEEE 802.11 MAC, and basically includes a "Listen Before Talk" access mechanism. In accordance with the above-mentioned access mechanism, the AP and/or STA may perform Clear Channel Assessment (CCA) for sensing an RF channel or medium during a predetermined time interval [for example, DCF Inter-Frame Space (DIFS)], prior to data transmission. If it is determined that the medium is in the idle state, frame transmission through the corresponding medium begins. On the other hand, if it is determined that the medium is in the occupied state, the corresponding AP and/or STA does not start its own transmission, establishes a delay time (for example, a random backoff period) for medium access, and attempts to start frame transmission after waiting for a predetermined time. Through application of a random backoff period, it is expected that multiple STAs will attempt to start frame transmission after waiting for different times, resulting in minimum collision.

In addition, IEEE 802.11 MAC protocol provides a Hybrid Coordination Function (HCF). HCF is based on DCF and Point Coordination Function (PCF). PCF refers to the polling-based synchronous access scheme in which periodic polling is executed in a manner that all reception (Rx) APs and/or STAs can receive the data frame. In addition, HCF includes Enhanced Distributed Channel Access (EDCA) and HCF Controlled Channel Access (HCCA). EDCA is achieved when the access scheme provided from a provider to a plurality of users is contention-based. HCCA is achieved by the contention-free-based channel access scheme based on the polling mechanism. In addition, HCF includes a medium access mechanism for improving Quality of Service (QoS) of WLAN, and may transmit QoS data in both a Contention Period (CP) and a Contention Free Period (CFP).

Figure 4:
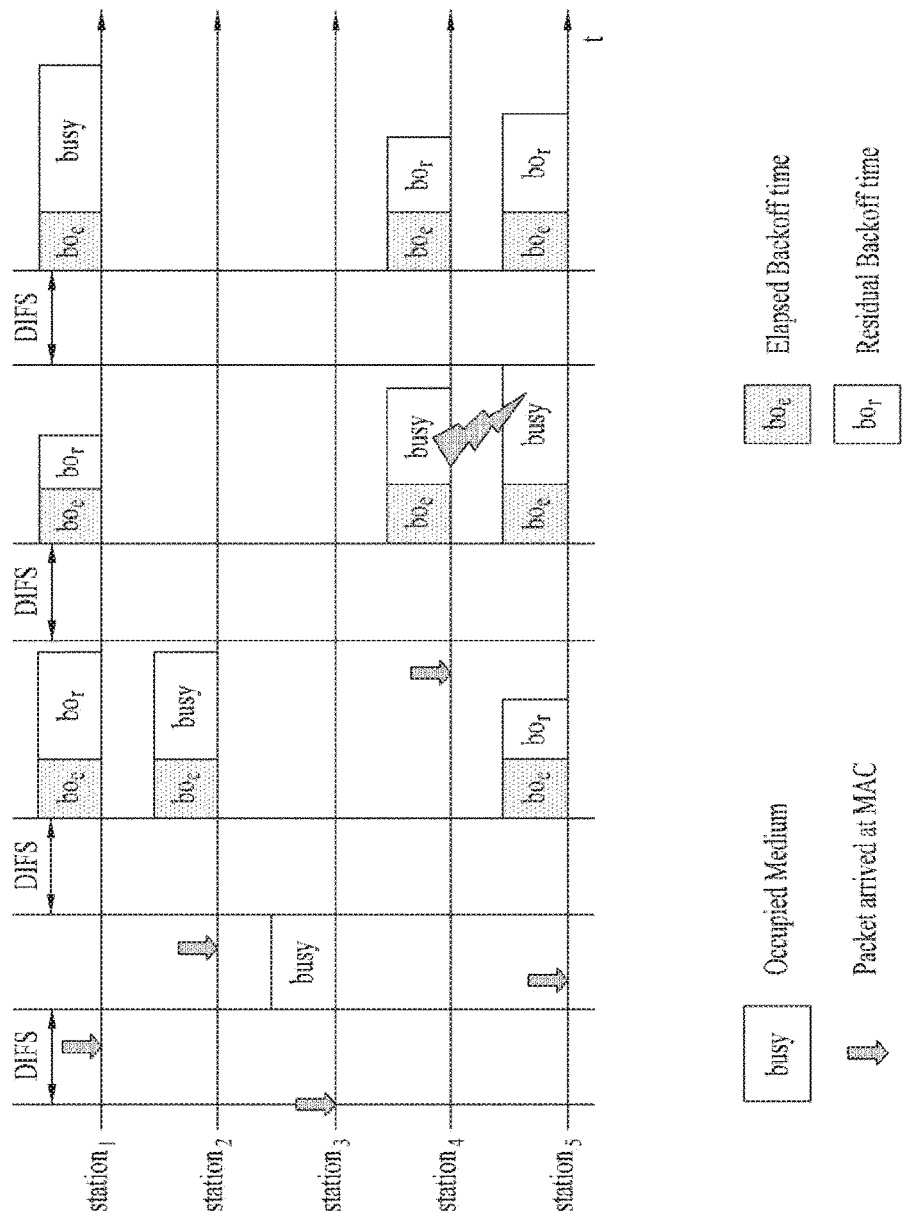
FIG. 4 illustrates a backoff procedure.

FIG. 4 is a conceptual diagram illustrating a backoff process.

Operations based on a random backoff period will hereinafter be described with reference to FIG. 4. If the occupy- or busy-state medium is shifted to an idle state, several STAs may attempt to transmit data (or frame). As a method for implementing a minimum number of collisions, each STA selects a random backoff count, waits for a slot time corresponding to the selected backoff count, and then attempts to start data transmission. The random backoff count has a value of a Packet Number (PN), and may be set to one of 0 to CW values. In this case, CW refers to a Contention Window parameter value. Although an initial value of the CW parameter is denoted by CWmin, the initial value may be doubled in case of a transmission failure (for example, in the case in which ACK of the transmission frame is not received). If the CW parameter value is denoted by CWmax, CWmax is maintained until data transmission is successful, and at the same time it is possible to attempt to start data transmission. If data transmission was successful, the CW parameter value is reset to CWmin. Preferably, CW, CWmin, and CWmax are set to $2^n-1$ (where n= 0, 1, 2, . . . ).

If the random backoff process starts operation, the STA continuously monitors the medium while counting down the backoff slot in response to the decided backoff count value. If the medium is monitored as the occupied state, the countdown stops and waits for a predetermined time. If the medium is in the idle state, the remaining countdown restarts.

As shown in the example of FIG. 4, if a packet to be transmitted to MAC of STA3 arrives at the STA3, the STA3 determines whether the medium is in the idle state during the DIFS, and may directly start frame transmission. In the meantime, the remaining STAs monitor whether the medium is in the busy state, and wait for a predetermined time. During the predetermined time, data to be transmitted may occur in each of STA1, STA2, and STA5. If the medium is in the idle state, each STA waits for the DIFS time and then performs countdown of the backoff slot in response to a random backoff count value selected by each STA. The example of FIG. 4 shows that STA2 selects the lowest backoff count value and STA1 selects the highest backoff count value. That is, after STA2 finishes backoff counting, the residual backoff time of STA5 at a frame transmission start time is shorter than the residual backoff time of STA1. Each of STA1 and STA5 temporarily stops countdown while STA2 occupies the medium, and waits for a predetermined time. If occupying of the STA2 is finished and the medium re-enters the idle state, each of STA1 and STA5 waits for a predetermined time DIFS, and restarts backoff counting. That is, after the remaining backoff slot as long as the residual backoff time is counted down, frame transmission may start operation. Since the residual backoff time of STA5 is shorter than that of STA1, STA5 starts frame transmission. Meanwhile, data to be transmitted may occur in STA4 while STA2 occupies the medium. In this case, if the medium is in the idle state, STA4 waits for the DIFS time, performs countdown in response to the random backoff count value selected by the STA4, and then starts frame transmission. FIG. 4 exemplarily shows the case in which the residual backoff time of STA5 is identical to the random backoff count value of STA4 by chance. In this case, an unexpected collision may occur between STA4 and STA5. If the collision occurs between STA4 and STA5, each of STA4 and STA5 does not receive ACK, resulting in the occurrence of a failure in data transmission. In this case, each of STA4 and STA5 increases the CW value two times, and STA4 or STA5 may select a random backoff count value and then perform countdown. Meanwhile, STA1 waits for a predetermined time while the medium is in the occupied state due to transmission of STA4 and STA5. In this case, if the medium is in the idle state, STA1 waits for the DIFS time, and then starts frame transmission after lapse of the residual backoff time.

STA Sensing Operation

As described above, the CSMA/CA mechanism includes not only a physical carrier sensing mechanism in which the AP and/or STA can directly sense the medium, but also a virtual carrier sensing mechanism. The virtual carrier sensing mechanism can solve some problems (such as a hidden node problem) encountered in the medium access. For the virtual carrier sensing, MAC of the WLAN system can utilize a Network Allocation Vector (NAV). In more detail, by means of the NAV value, the AP and/or STA, each of which currently uses the medium or has authority to use the medium, may inform another AP and/or another STA for the remaining time in which the medium is available. Accordingly, the NAV value may correspond to a reserved time in which the medium will be used by the AP and/or STA configured to transmit the corresponding frame. A STA having received the NAV value may prohibit medium access (or channel access) during the corresponding reserved time. For example, NAV may be set according to the value of a 'duration' field of the MAC header of the frame.

The robust collision detect mechanism has been proposed to reduce the probability of such collision, and as such a detailed description thereof will hereinafter be described with reference to FIGS. 7 and 8. Although an actual carrier sensing range is different from a transmission range, it is assumed that the actual carrier sensing range is identical to the transmission range for convenience of description and better understanding of the present invention.

Figure 5:
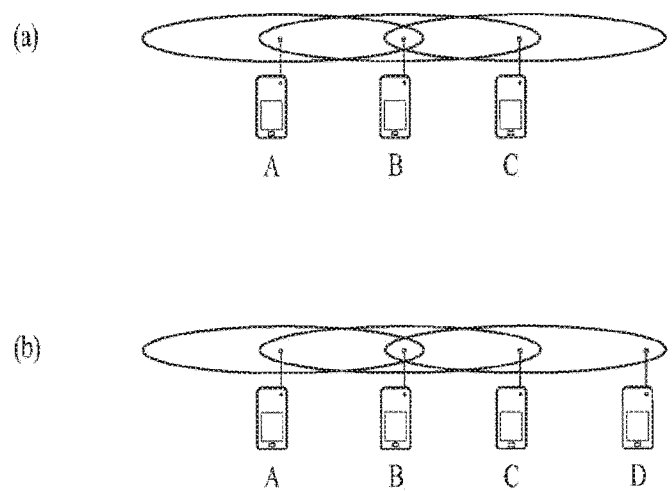
FIG. 5 is an explanatory diagram of a hidden node and an exposed node.

FIG. 5 is a conceptual diagram illustrating a hidden node and an exposed node.

FIG. 5(a) exemplarily shows the hidden node. In FIG. 5(a), STA A communicates with STA B, and STA C has information to be transmitted. In FIG. 5(a), STA C may determine that the medium is in the idle state when performing carrier sensing before transmitting data to STA B, under the condition that STA A transmits information to STA B. Since transmission of STA A (i.e., occupied medium) may not be detected at the location of STA C, it is determined that the medium is in the idle state. In this case, STA B simultaneously receives information of STA A and information of STA C, resulting in the occurrence of collision. Here, STA A may be considered as a hidden node of STA C.

FIG. 5(b) exemplarily shows an exposed node. In FIG. 5(b), under the condition that STA B transmits data to STA A, STA C has information to be transmitted to STA D. If STA C performs carrier sensing, it is determined that the medium is occupied due to transmission of STA B. Therefore, although STA C has information to be transmitted to STA D, the medium-occupied state is sensed, such that the STA C must wait for a predetermined time (i.e., standby mode) until the medium is in the idle state. However, since STA A is actually located out of the transmission range of STA C, transmission from STA C may not collide with transmission from STA B from the viewpoint of STA A, such that STA C unnecessarily enters the standby mode until STA B stops transmission. Here, STA C is referred to as an exposed node of STA B.

Figure 6:
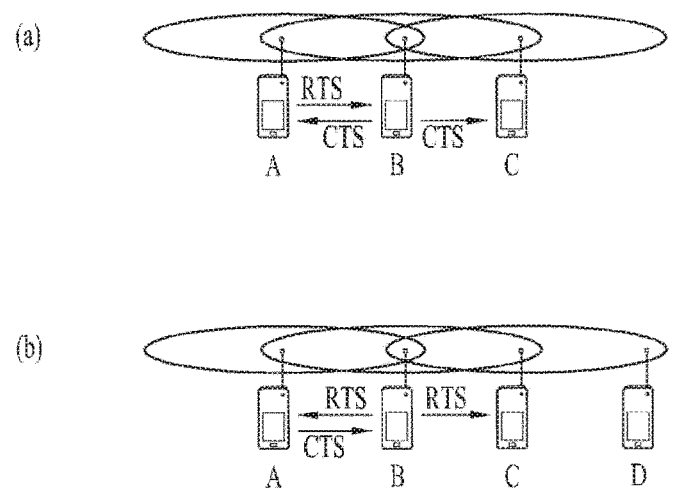
FIG. 6 is an explanatory diagram of RTS and CTS.

FIG. 6 is a conceptual diagram illustrating Request To Send (RTS) and Clear To Send (CTS).

In order to efficiently utilize the collision avoidance mechanism under the above-mentioned situation of FIG. 5, it is possible to use a short signaling packet such as RTS and CTS. RTS/CTS between two STAs may be overheard by peripheral STA(s), such that the peripheral STA(s) may consider whether information is communicated between the two STAs. For example, if STA to be used for data transmission transmits the RTS frame to the STA having received data, the STA having received data transmits the CTS frame to peripheral STAs, and may inform the peripheral STAs that the STA is going to receive data.

FIG. 6(a) exemplarily shows the method for solving problems of the hidden node. In FIG. 6(a), it is assumed that each of STA A and STA C is ready to transmit data to STA B. If STA A transmits RTS to STA B, STA B transmits CTS to each of STA A and STA C located in the vicinity of the STA B. As a result, STA C must wait for a predetermined time until STA A and STA B stop data transmission, such that collision is prevented from occurring.

FIG. 6(b) exemplarily shows the method for solving problems of the exposed node. STA C performs overhearing of RTS/CTS transmission between STA A and STA B, such that STA C may determine no collision although it transmits data to another STA (for example, STA D). That is, STA B transmits an RTS to all peripheral STAs, and only STA A having data to be actually transmitted can transmit a CTS. STA C receives only the RTS and does not receive the CTS of STA A, such that it can be recognized that STA A is located outside of the carrier sensing range of STA C.

Power Management

As described above, the WLAN system has to perform channel sensing before STA performs data transmission/reception. The operation of always sensing the channel causes persistent power consumption of the STA. There is not much difference in power consumption between the Reception (Rx) state and the Transmission (Tx) state. Continuous maintenance of the Rx state may cause large load to a power-limited STA (i.e., STA operated by a battery). Therefore, if STA maintains the Rx standby mode so as to persistently sense the channel, power is inefficiently consumed without special advantages in terms of WLAN throughput. In order to solve the above-mentioned problem, the WLAN system supports a Power Management (PM) mode of the STA.

The PM mode of the STA is classified into an active mode and a Power Save (PS) mode. The STA is basically operated in the active mode. The STA operating in the active mode maintains an awake state. If the STA is in the awake state, the STA may normally operate such that it can perform frame transmission/reception, channel scanning, or the like. On the other hand, STA operating in the PS mode is configured to switch from the doze state to the awake state or vice versa. STA operating in the sleep state is operated with minimum power, and the STA does not perform frame transmission/reception and channel scanning.

The amount of power consumption is reduced in proportion to a specific time in which the STA stays in the sleep state, such that the STA operation time is increased in response to the reduced power consumption. However, it is impossible to transmit or receive the frame in the sleep state, such that the STA cannot mandatorily operate for a long period of time. If there is a frame to be transmitted to the AP, the STA operating in the sleep state is switched to the awake state, such that it can transmit/receive the frame in the awake state. On the other hand, if the AP has a frame to be transmitted to the STA, the sleep-state STA is unable to receive the frame and cannot recognize the presence of a frame to be received. Accordingly, STA may need to switch to the awake state according to a specific period in order to recognize the presence or absence of a frame to be transmitted to the STA (or in order to receive a signal indicating the presence of the frame on the assumption that the presence of the frame to be transmitted to the STA is decided).

The AP may transmit a beacon frame to STAs in a BSS at predetermined intervals. The beacon frame may include a traffic indication map (TIM) information element. The TIM information element may include information indicating that the AP has buffered traffic for STAs associated therewith and will transmit frames. TIM elements include a TIM used to indicate a unicast frame and a delivery traffic indication map (DTIM) used to indicate a multicast or broadcast frame.

Figure 7:
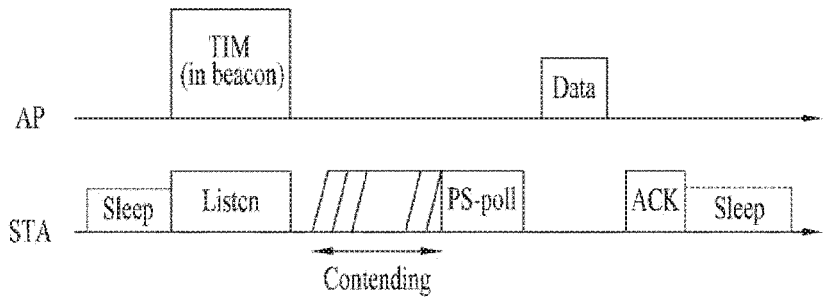
FIGS. 7 to 9 are explanatory diagrams of operation of an STA that has received TIM.
Figure 8:
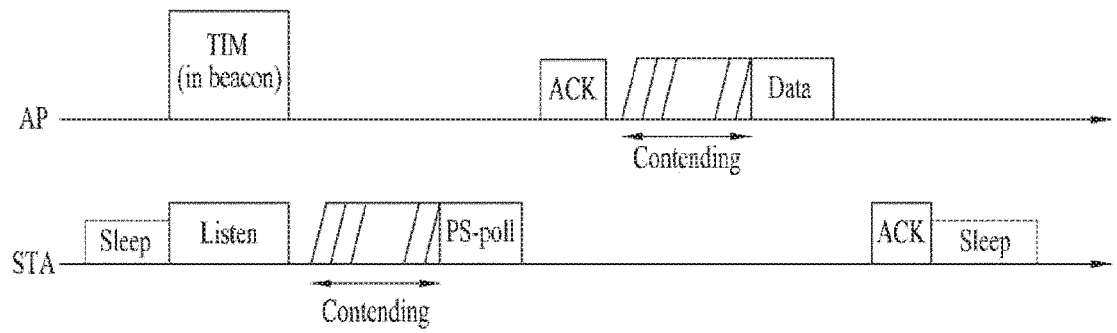
Figure 9:
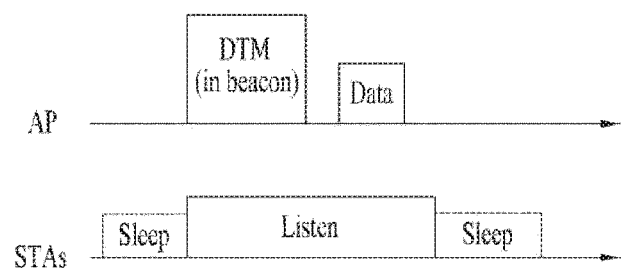

FIGS. 7 to 9 are conceptual diagrams illustrating detailed operations of the STA having received a Traffic Indication Map (TIM).

Referring to FIG. 7, STA is switched from the sleep state to the awake state so as to receive the beacon frame including a TIM from the AP. STA interprets the received TIM element such that it can recognize the presence or absence of buffered traffic to be transmitted to the STA. After STA contends with other STAs to access the medium for PS-Poll frame transmission, the STA may transmit the PS-Poll frame for requesting data frame transmission to the AP. The AP having received the PS-Poll frame transmitted by the STA may transmit the frame to the STA. STA may receive a data frame and then transmit an ACK frame to the AP in response to the received data frame. Thereafter, the STA may re-enter the sleep state.

As can be seen from FIG. 7, the AP may operate according to the immediate response scheme, such that the AP receives the PS-Poll frame from the STA and transmits the data frame after lapse of a predetermined time [for example, Short Inter-Frame Space (SIFS)]. In contrast, the AP having received the PS-Poll frame does not prepare a data frame to be transmitted to the STA during the SIFS time, such that the AP may operate according to the deferred response scheme, and as such a detailed description thereof will hereinafter be described with reference to FIG. 8.

The STA operations of FIG. 8 in which the STA is switched from the sleep state to the awake state, receives a TIM from the AP, and transmits the PS-Poll frame to the AP through contention are identical to those of FIG. 7. If the AP having received the PS-Poll frame does not prepare a data frame during the SIFS time, the AP may transmit the ACK frame to the STA instead of transmitting the data frame. If the data frame is prepared after transmission of the ACK frame, the AP may transmit the data frame to the STA after completion of such contending. STA may transmit the ACK frame indicating successful reception of a data frame to the AP, and may be shifted to the sleep state.

FIG. 9 shows the exemplary case in which AP transmits DTIM. STAs may be switched from the sleep state to the awake state so as to receive the beacon frame including a DTIM element from the AP. STAs may recognize that multicast/broadcast frame(s) will be transmitted through the received DTIM. After transmission of the beacon frame including the DTIM, AP may directly transmit data (i.e., multicast/broadcast frame) without transmitting/receiving the PS-Poll frame. While STAs continuously maintains the awake state after reception of the beacon frame including the DTIM, the STAs may receive data, and then switch to the sleep state after completion of data reception.

General Frame Structure

Figure 10:
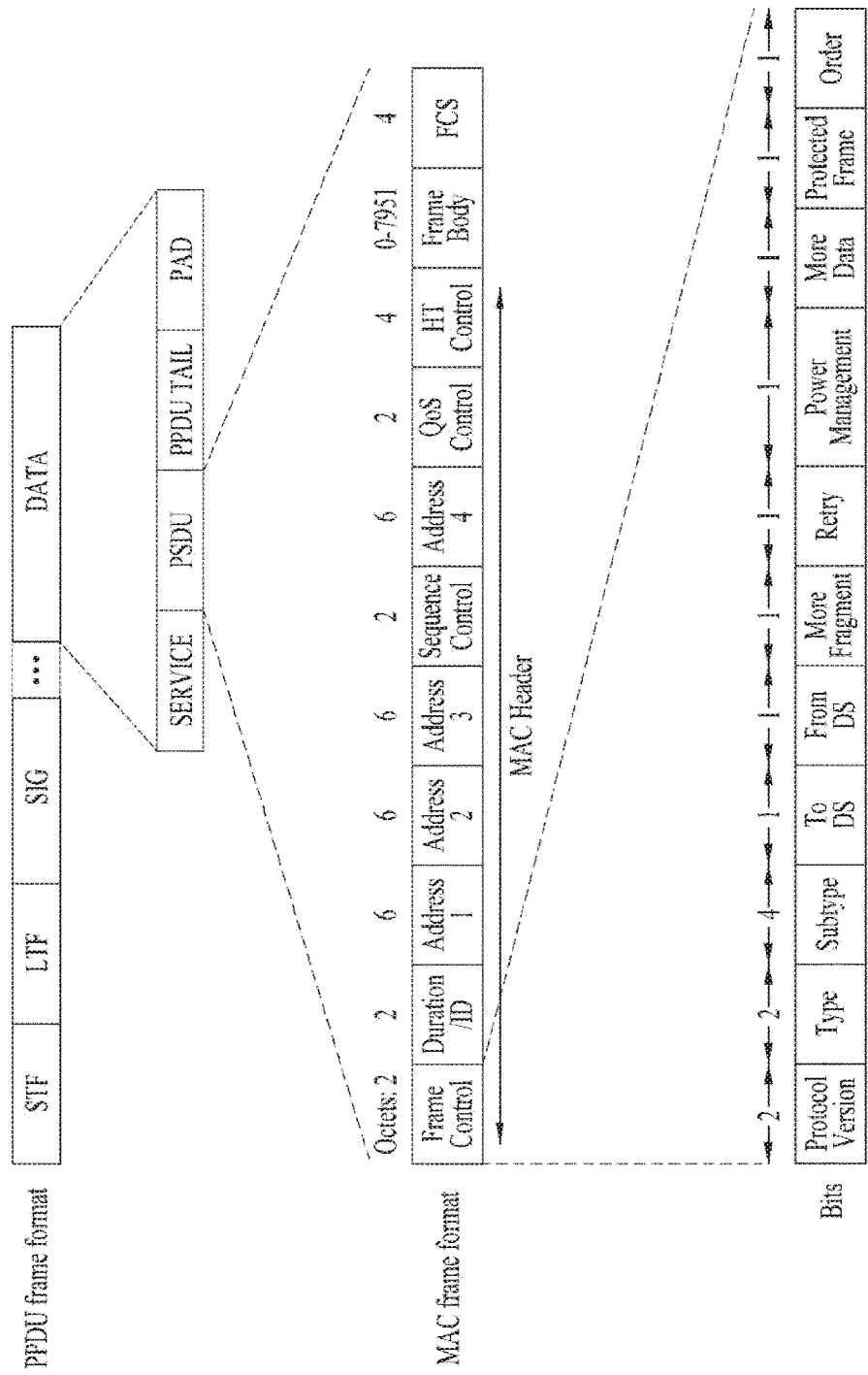
FIG. 10 is an explanatory diagram of an exemplary frame structure used in an IEEE 802.11 system.
Figure 12:
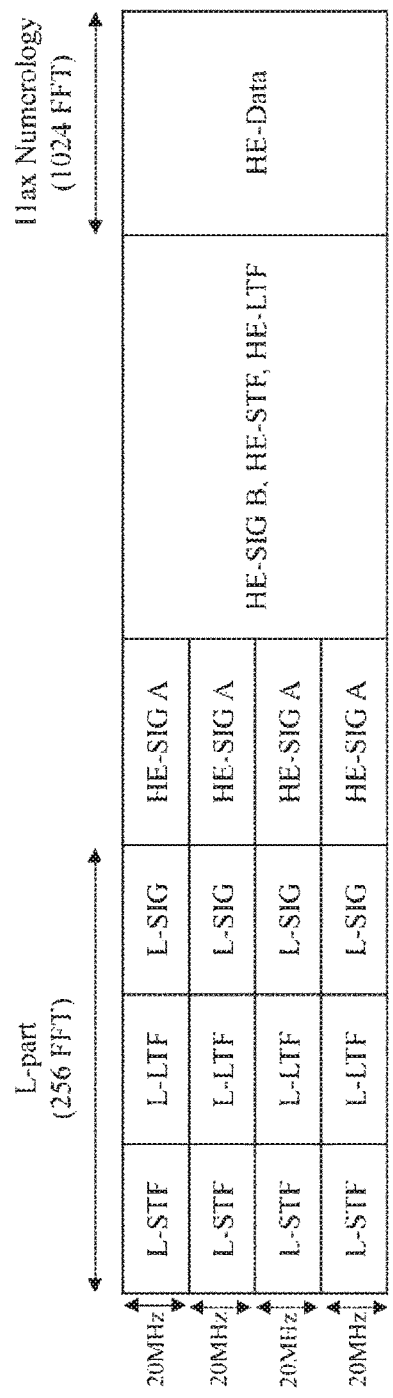
FIG. 12 illustrates an example of HE PPDU.

FIG. 10 is an explanatory diagram of an exemplary frame structure used in an IEEE 802.11 system.

A PPDU (Physical Layer Protocol Data Unit) frame format may include an STF (Short Training Field), am LTF (Long Training Field), a SIG (SIGNAL) field and a data field. The most basic (e.g., non-HT (High Throughput)) PPDU frame format may include only an L-STF (Legacy-STF), an L-LTF (Legacy-LTF), a SIG field and a data field.

The STF is a signal for signal detection, AGC (Automatic Gain Control), diversity selection, accurate time synchronization, etc., and the LTF is a signal for channel estimation, frequency error estimation, etc. The STF and LTF may be collectively called a PLCP preamble. The PLCP preamble may be regarded as a signal for OFDM physical layer synchronization and channel estimation.

The SIG field may include a RATE field and a LENGTH field. The RATE field may include information about modulation and coding rates of data. The LENGTH field may include information about the length of data. In addition, the SIG field may include a parity bit, a SIG TAIL bit, etc.

The data field may include a SERVICE field, a PSDU (Physical layer Service Data Unit) and a PPDU TAIL bit. The data field may also include padding bits as necessary. Some bits of the SERVICE field may be used for synchronization of a descrambler at a receiving end. The PSDU corresponds to an MPDU (MAC Protocol Data Unit) defined in the MAC layer and may include data generated/used in a higher layer. The PPDU TAIL bit may be used to return an encoder to state 0. The padding bits may be used to adjust the length of the data field to a predetermined unit.

The MPDU is defined depending on various MAC frame formats, and a basic MAC frame includes a MAC header, a frame body and an FCS (Frame Check Sequence). The MAC frame may be composed of the MPDU and transmitted/received through PSDU of a data part of the PPDU frame format.

The MAC header includes a frame control field, a duration/ID field, an address field, etc. The frame control field may include control information necessary for frame transmission/reception. The duration/ID field may be set to a time to transmit a relevant a relevant frame.

The duration/ID field included in the MAC header may be set to a 16-bit length (e.g., B0 to B15). Content included in the duration/ID field may depend on frame type and sub-type, whether transmission is performed for a CFP (contention free period), QoS capability of a transmission STA and the like. (i) In a control frame corresponding to a sub-type of PS-Poll, the duration/ID field may include the AID of the transmission STA (e.g., through 14 LSBs) and 2 MSBs may be set to 1. (ii) In frames transmitted by a PC (point coordinator) or a non-QoS STA for a CFP, the duration/ID field may be set to a fixed value (e.g., 32768). (iii) In other frames transmitted by a non-QoS STA or control frames transmitted by a QoS STA, the duration/ID field may include a duration value defined per frame type. In a data frame or a management frame transmitted by a QoS STA, the duration/ID field may include a duration value defined per frame type. For example, B15=0 of the duration/ID field indicates that the duration/ID field is used to indicate a TXOP duration, and B0 to B14 may be used to indicate an actual TXOP duration. The actual TXOP duration indicated by B0 to B14 may be one of 0 to 32767 and the unit thereof may be microseconds (μs). However, when the duration/ID field indicates a fixed TXOP duration value (e.g., 32768), B15 can be set to 1 and B0 to B14 can be set to 0. When B14=1 and B15=1, the duration/ID field is used to indicate an AID, and B0 to B13 indicate one AID of 1 to 2007. Refer to the IEEE 802.11 standard document for details of Sequence Control, QoS Control, and HT Control subfields of the MAC header.

The frame control field of the MAC header may include Protocol Version, Type, Subtype, To DS, From DS, More Fragment, Retry, Power Management, More Data, Protected Frame and Order subfields. Refer to the IEEE 802.11 standard document for contents of the subfields of the frame control field.

Example of VHT PPDU Structure

FIG. 11 illustrates an example of VHT (Very High Throughput) PPDU.

A VHT PPDU format may include at least one or more of a VHT-SIG-A field, a VHT-STF field, a VHT-LTF field and a VHT SIG-B field between L-SIG field and a data field.

VHT-SIGA may include VHT SIG-A1 and VHT SIG-A2. At this time, each of VHT SIG-A1 and VHT SIG-A2 may include 24 data bits. VHT SIG-A1 may be transmitted prior to VHT SIG-A2. At this time, VHT SIG-A1 may include BW, STBC, Group ID, NSTS/Partial AID, TXOP_PS_NOT_ALLOWED field, Reserved field, etc. Also, VHT SIG-A2 may include Short GI, Short GI NSYM Disambiguation, SU/MU[0] Coding, LDPC Extra OFDM Symbol, SU VHT-MCS/MU[1-3] Coding, Beamformed, CRC, Tail and Reserved field, etc. Therefore, information on VHT PPDU may be identified.

GID (Group ID) and PAID (Partial AID) included in VHT SIG-A1 will be described in more detail. PAID is a nonunique STA identifier, and is defined as listed in Table 1. PAID is transmitted through TXVECTOR parameter PARTIAL_AID of VHT SU PPD, and is limited to 9 bits.

STA, which transmits VHT SU PPDU for carrying one or more group addressed MPDUs or VHT NDP for multiple receivers, sets GROUP_ID among TXVECTOR parameters to 63 and sets PARTIAL_AID to 0.

STA, which transmits VHT SU PPDU for carrying one or more individually addressed MPDUs or VHT NDP for a single receiver may set GROUP_ID and PARTIAL_AID among TXVECTOR parameters as listed in Table 1.

TABLE 1

| Condition | GROUP_ID | PARTIAL_AID |
|---|---|---|
| Addressed to AP | 0 | BSSID[39:47] |
| Addressed to Mesh STA | 0 | RA[39:47] |
| Sent by an AP and addressed to a STA associated with that AP or sent by a DLS or TDLS STA in a direct path to a DLS or TDLS peer STA | 63 | (AID + (BSSID[44:47] ⊕ BSSID[40:43]) × $2^5$) mod $2^9$ |
| Otherwise (see NOTE) | 63 | 0 |

NOTE
The last row covers the following cases:
A PPDU sent to an IBSS STA
A PPDU sent by an AP to a non associated STA
Any other condition not explicitly listed elsewhere in the table In Table 1, ID[b:c] means $b^{th}$ bit to cth bit of ID (supposing that $0^{th}$ bit is the first bit of ID).

The AP should allocate AID such that PAID of a corresponding STA is not 0 when allocating AID to the corresponding STA. STA which transmits VHT MU PPDU should set GID.

For example, it is assumed that BSS of which BSSID is 00-21-6A-AC-53-5232 exists and a non-AP STA allocated with AID 5 exists within the BSS. In VHT PPDUs transmitted to the AP, GROUP_ID is set to 0 and PARTIAL_AID is set to 164. In VHT PPDUs transmitted from the AP to the non-AP STAs, GROUP_ID is set to 63 and PARTIAL_AID is set to 229.

VHT TXOP Power Save

A VHT TXOP Power Save operation may be performed if the AP is allowed.

As a case that the AP allows the non-AP STA to enter a doze state for TXOP, if any one of the following conditions is satisfied, the non-AP STA may enter the doze state until the end of the TXOP:

as the case that VHT MU PPDU is received, when it is determined the STA is not a member of a group indicated by RXVECTOR parameter GROUP_ID;

as the case that SU PPDU is received, when RXVECTOR parameter PARTIAL_AID is not 0 and is not identical with PAID of the STA;

when PARTIAL_AID of RXVECTOR is identical with PAID of the STA but RA field included in MAC header of the received frame is not identical with MAC address of the STA;

when the STA is a member of a group indicated by RXVECTOR GROUP_ID and RXVECTOR parameter NUM_STS included in the received frame is 0;

as the case that VHT NDP Announcement frame is received, when RXVECTOR parameter PARTIAL_AID is 0 and AID included in STA Info field is not AID of STA; and when the STA receives a frame intended therefor, and More Data subfield is 0 and Ack Policy subfield is No Ack.

Example of HE PPDU Structure

A description will be given of examples of an HE PPDU (High Efficiency Physical layer Protocol Data Unit) format in a wireless LAN system supporting 11ax.

FIGS. 12 to 16 illustrate example of the HE PPDU.

An HE-SIG A (or HE-SIG1) field follows an L-Part (e.g., L-STF, L-LTF, L-SIG) and is duplicated every 20 MHz like the L-Part. For the HE-SIG A field, a DFT period of 3.2 μs and a subcarrier spacing of 312.5 KHz may be used. If MCS 0 is used, for example, the HE-SIG A field can be composed of 2 symbols.

HE-SIG A can be included in all HE PPDUs, whereas HE-SIG B can be omitted in an SU PPDU and a UL trigger based PPDU (e.g., a UL PPDU transmitted n the basis of a trigger frame).

The HE-SIG A field includes common control information (e.g., BW, GI length, BSS index, CRC, Tail, etc.) for STAs. The HE-SIG A field includes information for decoding the HE PPDU and thus information included in the HE-SIG A field may depend on the format of the HE PPDU (e.g., SU PPDU, MU PPDU, trigger-based PPDU or the like). For example, in the HE SU PPDU format, the HE-SIG A field may include at least one of a DL/UL indicator, HE PPDU format indicator, BSS color, TXOP duration, BW (bandwidth), MCS, CP+LTF length, coding information, the number of streams, STBC (e.g., whether STBC is used), transmission beamforming (TxBF) information, CRC and Tail. In the case of the HE SU PPDU format, the HE-SIG B field may be omitted. In the HE MU PPDU format, the HE-SIG A field may include at least one of a DL/UL indicator, BSS color, TXOP duration, BW, MCS information of a SIG B field, the number of symbols of the SIG B field, the number of HE LTF symbols, indicator indicating whether full band MU-MIMO is used, CP+LTF length, transmission beamforming (TxBF) information, CRC and Tail. In the HE trigger-based PPDU format, an HE-SIG A field may include at least one of a format indicator (e.g., indicating the SU PPDU or trigger-based PPDU), BSS color, TXOP duration, BW, CRC and Tail.

The HE-SIG A may include user allocation information, for example, at least one of an STA ID such as a PAID or a GID, allocated resource information and the number of streams (Nsts), in addition to the common control information.

BSS color information included in the HE-SIG A field is information for identifying a BSS and has a length shorter than a BSSID. For example, the BSSID can have a length of 48 bits whereas the BSS color information can have a length of 6 bits. An STA can determine whether a frame is an intra-BSS frame using the BSS color information. That is, the STA can discriminate an intra-BSS PPDU from an inter-BSS PPDU by decoding only the HE-SIG A field without the need to decode the entire HE PPDU.

Figure 13:
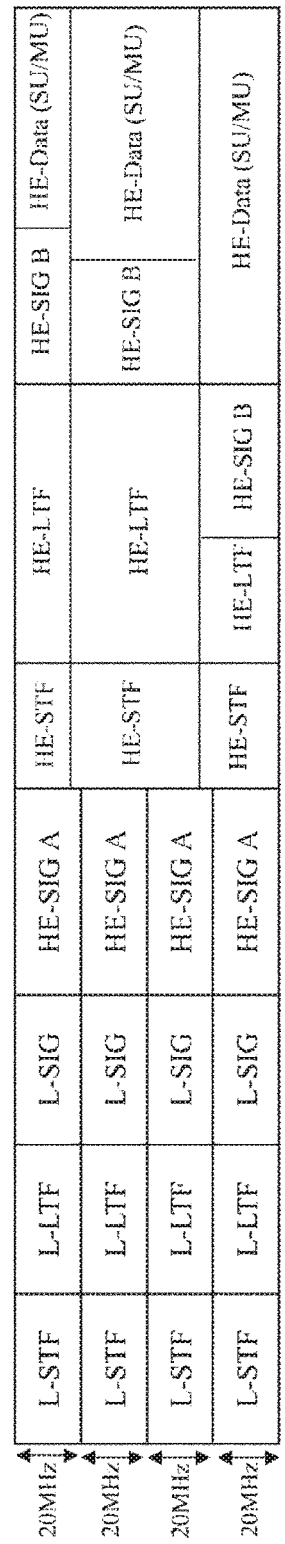
FIG. 13 illustrates another example of HE PPDU.

Referring to FIG. 13, the HE-SIG B (or HE-SIG2) may be transmitted for each OFDMA allocation. In the case of MU-MIMO, the HE-SIG B is identified by an STA through SDM. The HE-SIG B may include additional user allocation information, for example, an MCS, coding information, STBC (Space Time Block Code) information and transmission beamforming (TXBF) information.

Figure 14:
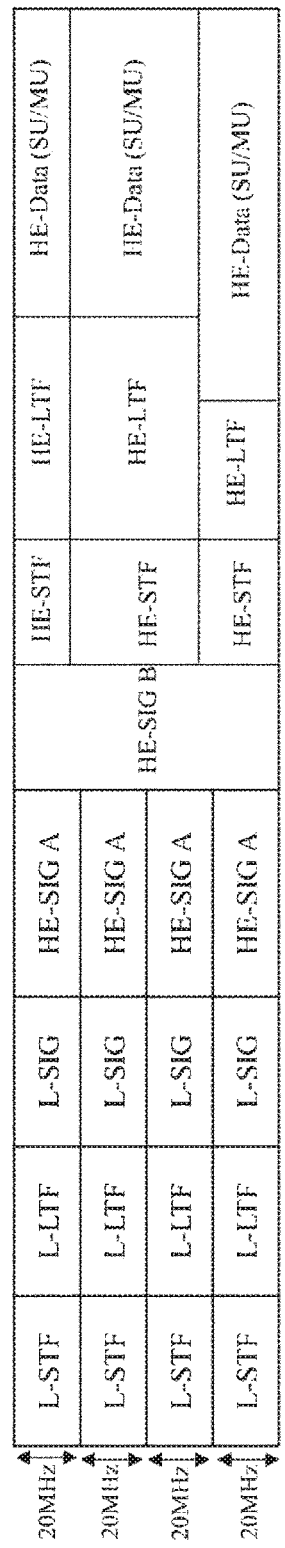
FIG. 14 illustrates still another example of HE PPDU.

FIG. 14 illustrates another example of the HE PPDU. The HE-SIG B is transmitted following the HE-SIG A. The HE-SIG B may be transmitted through the full band on the basis of numerology of the HE-SIG A. The HE-SIG B may include user allocation information, for example, STA AID, resource allocation information (e.g., allocation size), MCS, the number of streams (Nsts), coding, STBC and transmission beamforming (TXBF) information.

Figure 15:
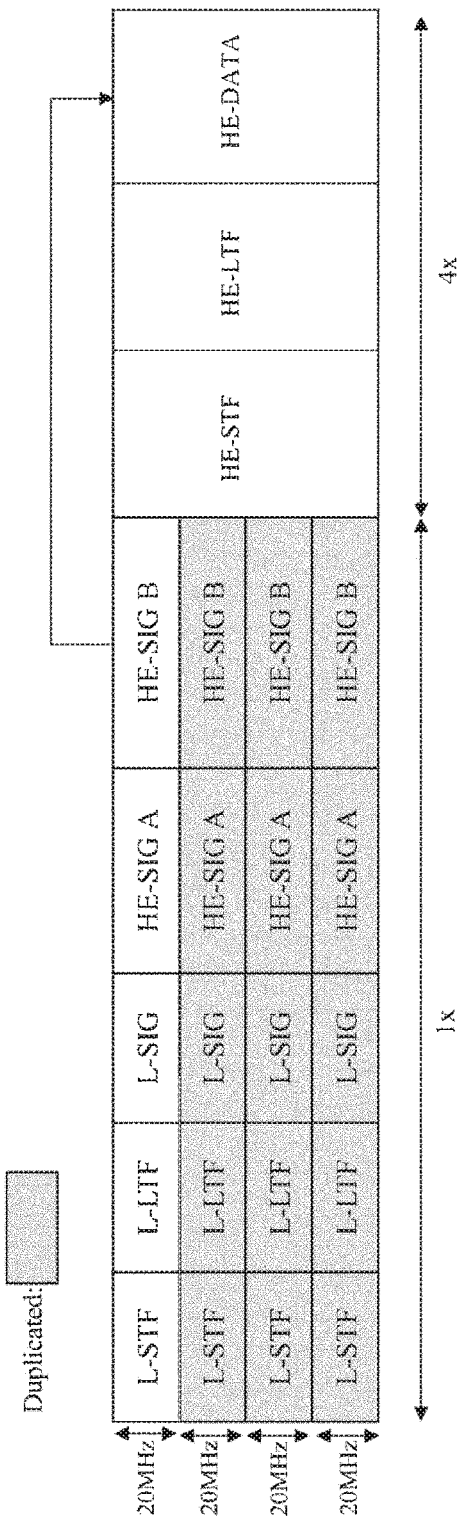
FIG. 15 illustrates further still another example of HE PPDU.

FIG. 15 illustrates another example of the HE PPDU. The HE-SIG B may be duplicated per predetermined unit channel. Referring to FIG. 15, the HE-SIG B may be duplicated per 20 MHz. For example, the HE-SIG B can be transmitted in such a manner that the same information is duplicated per 20 MHz in 80 MHz bandwidth.

An STA/AP which has received the HE-SIG B duplicated every 20 MHz may accumulate the received HE-SIG B per 20 MHz channel to improve reliability of HE-SIG B reception.

Since the same signal (e.g., HE-SIG B) is duplicated and transmitted per channel, the gain of accumulated signals is proportional to the number of channels over which the signal is duplicated and transmitted to improve reception performance. In theory, a duplicated and transmitted signal can have a gain corresponding to 3 dB×(the number of channels) compared to the signal before duplication. Accordingly, the duplicated and transmitted HE-SIG B may be transmitted with an increased MCS level depending on the number of channels through which the HE-SIG B is duplicated and transmitted. For example, if MCS0 is used for the HE-SIG B transmitted without being duplicated, MCS1 can be used for the HE-SIG B duplicated and transmitted. Since the HE-SIG B can be transmitted with a higher MCS level as the number of channels for duplication increases, HE-SIG B overhead per unit channel can be reduced.

Figure 16:
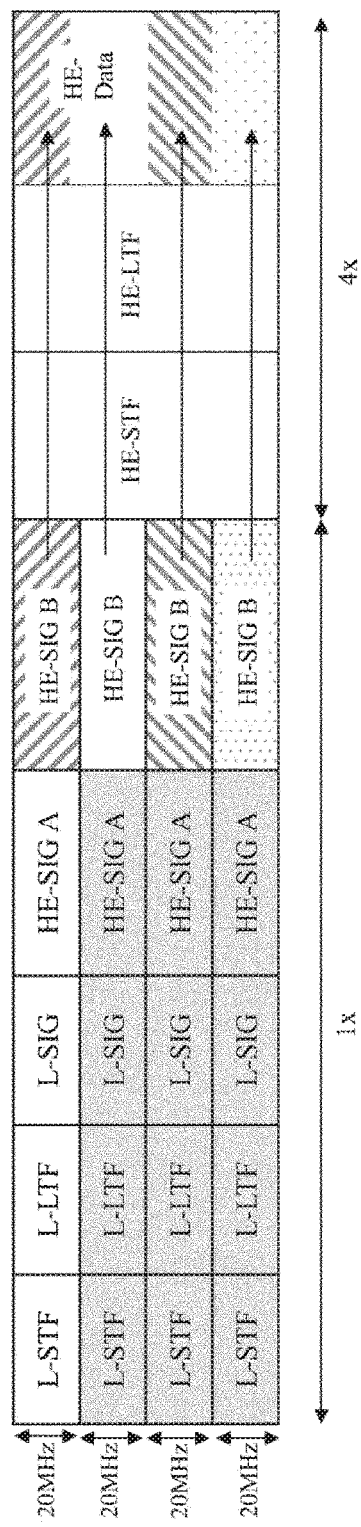
FIG. 16 illustrates further still another example of HE PPDU.

FIG. 16 illustrates another example of the HE PPDU. Referring to FIG. 16, the HE-SIG B may include independent information per 20 MHz channel. The HE-SIG B may be transmitted in a 1× symbol structure like the Legacy part (e.g., L-STF, L-LTF, L-SIG) and HE-SIG A. Meanwhile, a length of "L-STF+L-LTF+L-SIG+HE-SIGA+HE-SIGB" needs to be identical in all channels in a wide bandwidth. The HE-SIG B transmitted per 20 MHz channel may include allocation information about the corresponding band, for example, allocation information per user using the corresponding band, user ID, etc. However, the information of the HE-SIG B may vary between bands because the respective bands support different numbers of users and use different resource block configurations. Accordingly, the length of the HE-SIG B may be different for respective channels.

Figure 17:
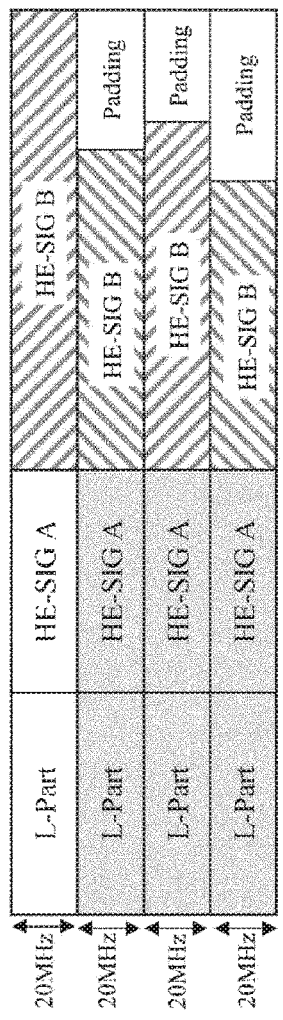
FIGS. 17 and 18 illustrates a padding method for HE PPDU.
Figure 18:
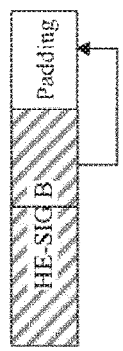
Figure 18:
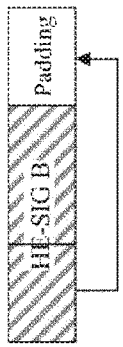

FIG. 17 illustrates an HE-SIG B padding method by which lengths before HE-STF (e.g., lengths to the HE-SIG B) become identical for respective channels. For example, the HE-SIG B may be duplicated by a padding length to align HE-SIG B lengths. As illustrated in FIG. 18, the HE-SIG B corresponding to a necessary padding length may be padded to the HE-SIG B from the start (or end) of the HE-SIG B.

According to an example, one HE-SIG B field can be transmitted when the bandwidth does not exceed 20 MHz. When the bandwidth exceeds 20 MHz, 20 MHz channels may respectively transmit one of a first type HE-SIG B (referred to hereinafter as HE-SIG B [1]) and a second type HE-SIG B (referred to hereinafter as HE-SIG B [2]). For example, HE-SIG B [1] and HE-SIG B [2] may be alternately transmitted. An odd-numbered 20 MHz channel may deliver HE-SIG B [1] and an even-numbered 20 MHz channel may deliver HE-SIG B [2]. More specifically, in the case of a 40 MHz bandwidth, HE-SIG B [1] is transmitted over the first 20 MHz channel and HE-SIG B [2] is transmitted over the second 20 MHz channel. In the case of an 80 MHz bandwidth, HE-SIG B [1] is transmitted over the first 20 MHz channel, HE-SIG B [2] is transmitted over the second 20 MHz channel, the same HE-SIG B [1] is duplicated and transmitted over the third 20 MHz channel and the same HE-SIG B [2] is duplicated and transmitted over the fourth 20 MHz channel. The HE-SIG B is transmitted in a similar manner in the case of a 160 MHz bandwidth.

As described above, the HE-SIG B can be duplicated and transmitted as the bandwidth increases. Here, a duplicated HE-SIG B may be frequency-hopped by 20 MHz from a 20 MHz channel over which an HE-SIG B of the same type is transmitted and transmitted.

HE-SIG B [1] and HE-SIG B [2] may have different content. However, HE-SIG-Bs [1] have the same content. Similarly, HE-SIG Bs [2] have the same content.

According to an embodiment, HE-SIG B [1] may be configured to include resource allocation information about only odd-numbered 20 MHz channels and HE-SIG B [2] may be configured to include resource allocation information about only even-numbered 20 MHz channels. According to another embodiment of the present invention, HE-SIG B [1] may include resource allocation information about at least part of even-numbered 20 MHz channels or HE-SIG B [2] may include resource allocation information about at least part of odd-numbered 20 MHz channels.

The HE-SIG B may include a common field and a user-specific field. The common field may precede the user-specific field. The common field and the user-specific field may be distinguished in a unit of bit(s) instead of a unit of OFDM symbol(s).

The common field of the HE-SIG B includes information about all STAs designated to receive PPDUs in a corresponding bandwidth. The common field may include resource unit (RU) allocation information. All the HE-SIG Bs [1] may have the same content and all the HE-SIG Bs [2] may have the same content. For example, when four 20 MHz channels constituting 80 MHz are classified as [LL, LR, RL, RR], the common field of HE-SIG B [1] may include a common block for LL and RL and the common field of HE-SIG B [2] may include a common block for LR and RR.

The user-specific field of the HE-SIG B may include a plurality of user fields. Each user field may include information specific to an individual STA designated to receive PPDUs. For example, the user field may include at least one of an STA ID, MCS per STA, the number of streams (Nsts), coding (e.g., indication of use of LDPC), DCM indicator and transmission beamforming information. However, the information of the user field is not limited thereto.

UL MU Transmission

Figure 19:
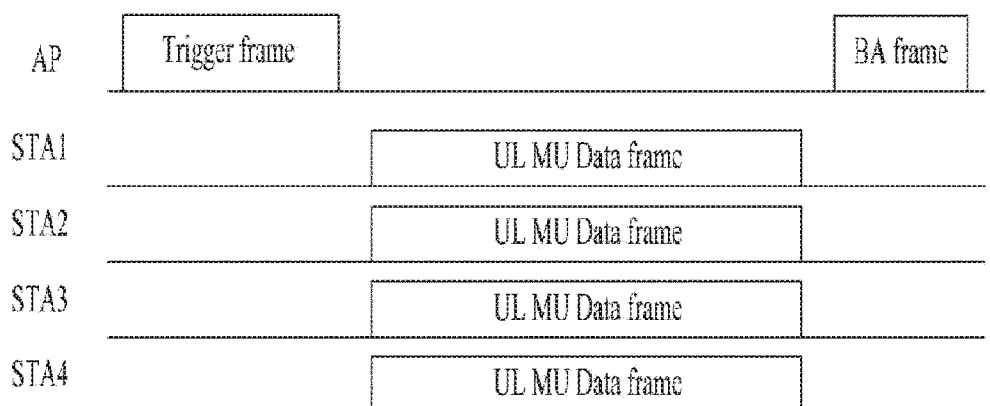
FIG. 19 is a diagram illustrating an uplink multi-user transmission status according to one embodiment of the present invention.

FIG. 19 is an explanatory diagram of an uplink multi-user transmission situation according to an embodiment of the present invention.

As described above, an 802.11ax system may employ UL MU transmission. UL MU transmission may be started when an AP transmits a trigger frame to a plurality of STAs (e.g., STA1 to STA4), as illustrated in FIG. 19. The trigger frame may include UL MU allocation information. The UL MU allocation information may include at least one of resource position and size, STA IDs or reception STA addresses, MCS and MU type (MIMO, OFDMA, etc.). Specifically, the trigger frame may include at least one of (i) a UL MU frame duration, (ii) the number of allocations (N) and (iii) information per allocation. The information per allocation may include information per user (Per user Info). The information per allocation may include at least one of an AID (AIDs corresponding to the number of STAs are added in the case of MU), power adjustment information, resource (or tone) allocation information (e.g., bitmap), MCS, the number of streams (Nsts), STBC, coding and transmission beamforming information.

As illustrated in FIG. 19, the AP may acquire TXOP to transmit the trigger frame through a contention procedure to access media. Accordingly, the STAs may transmit UL data frames in a format indicated by the AP after SIFS of the trigger frame. It is assumed that the AP according to an embodiment of the present invention sends an acknowledgement response to the UL data frames through a block ACK (BA) frame.

HE PPDU Based Power Save Mode

HE PPDU (or 11ax PPDU) based PS (Power Save) mode will be described.

The HE non-AP STA which has received HE DL MU PPDU may enter the doze state until the end of HE DL MU PPDU if the following conditions (i) and (ii) are satisfied: (i) a value of a BSS color field included in HE-SIG A field of HE DL MU PPDU is identical to a color of BSS to which the STA belongs; and (ii) a value deducted by any one of STA IDs included in the HE-SIG B field is not identical to ID of the corresponding STA or broadcast/multicast ID.

HE non-AP STA which has received HE UL MU PPDU may enter the doze state until the end of HE UL MU PPDU if the value of the BSS color included in HE-SIG A of HE UL MU PPDU is identical to a color of BSS to which the STA belongs.

Figure 20:
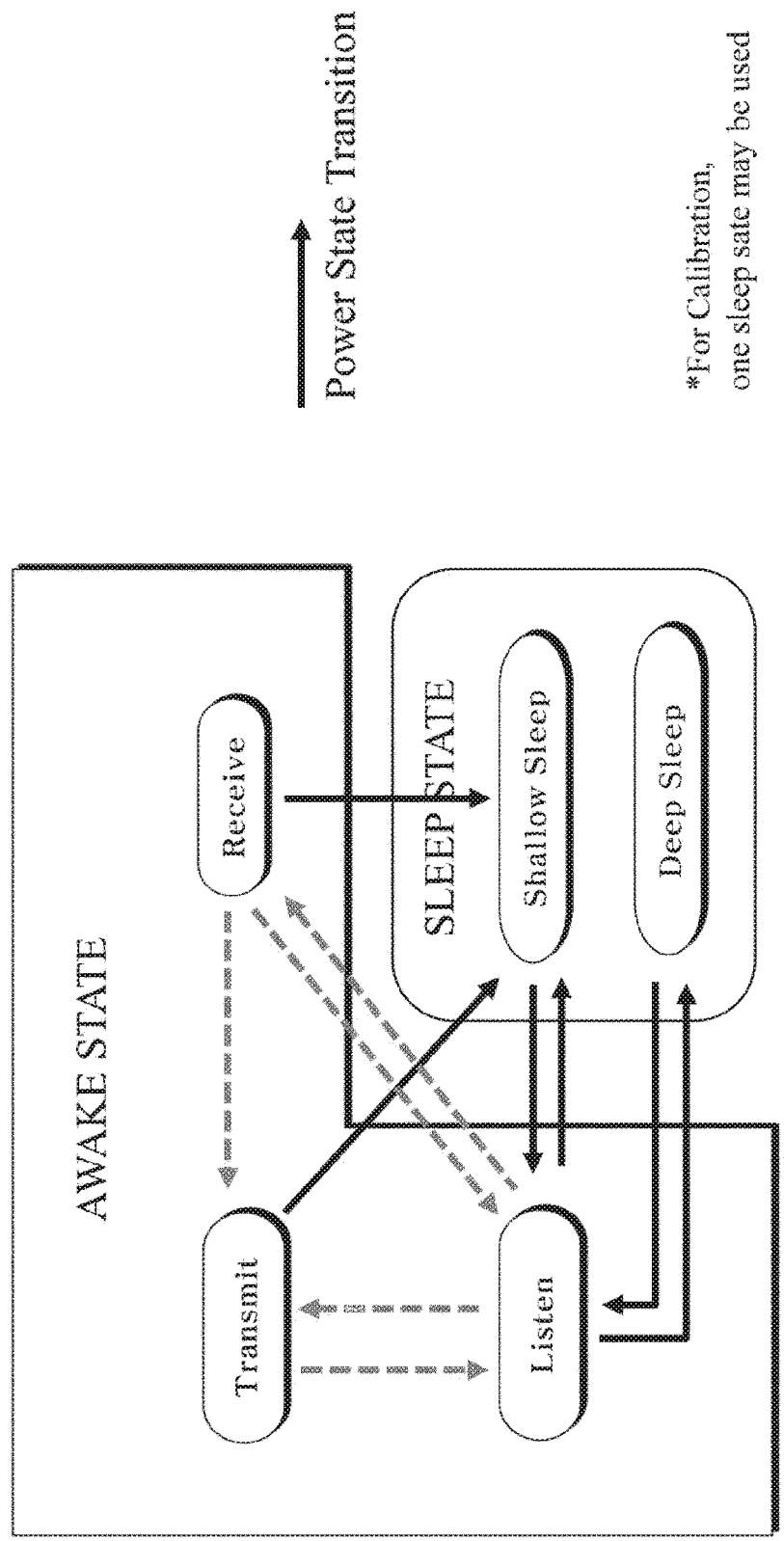
FIG. 20 illustrates an awake state and a sleep state, which are defined in 11ax.

FIG. 20 illustrates an awake state and a sleep state, which are defined in 11ax.

Generally, the sleep state (or doze state) may include a shallow sleep state and deep sleep state. The deep sleep state is a sleep state that a minimum power (non-zero) is consumed, and needs the longest time to shift to a listening state. The shallow sleep state is a sleep state that consumes relatively more power than the deep sleep state but may shift to a listening state more quickly than the deep sleep state.

Meanwhile, the shallow sleep state and the deep sleep state may be defined as follows. The deep sleep state is a state that wireless radio is turned off, that is, RF, baseband processor and MAC processor are all switched off, and may be a state that a leakage power is only consumed. The shallow sleep state may be a sleep state that baseband processor and MAC processor are switched on but RF is switched off.

Table 2 illustrates an example of current consumption in the deep sleep state.

TABLE 2

Power State parameters
Average Current Consumption [mA]
Voltage = 1.1 V,
Band = {2.4 GHz, 5 GHz}, NSS = {1},
Number of TX/RX antennas = {1}, TX power per antenna = {15 dBm}

| Power State | Bandwidth = {20 MHz} | Bandwidth = {40 MHz} | Bandwidth = {80 MHz} |
| --- | --- | --- | --- |
| Transmit | 280 mA | 280 mA | 280 mA |
| Receive | 100 mA | 140 mA | 200 mA |
| Listen | 50 mA | 60 mA | 75 mA |
| Shallow Sleep | 0.9 mA | 0.9 mA | 0.9 mA |
| Deep Sleep | 0.09 mA | 0.09 mA | 0.09 mA |

Table 3 illustrates power and latency of state switching of 802.11ax.

TABLE 3

Power Transition parameters

| State Transitions | Transition Time (ms) | Average Power Consumption (mW) |
| --- | --- | --- |
| Transmit to Listen | $T_{TL}$ = 0.01 ms | 75 mW |
| Receive ⇔ Listen | 0.001 ms | 55 mW |
| Listen to Transmit | $T_{LT}$ = 0.01 ms | $P_{LT}$ = 100 mW |
| Transmit to Shallow Sleep | $T_{TS}$ = 0.01 ms | $P_{TS}$ = 15 mW |
| Receive to Shallow Sleep | $T_{RS}$ = 0.2 ms | PRS = 15 mW |
| Listen to Shallow Sleep | $T_{LS}$ = 0.2 ms | PLS = 5 mW |
| Shallow Sleep to Listen | 0.5 ms ($T_{SL}$) | |
| Listen to Deep Sleep | $T_{LD}$ = 1 ms | $P_{DS}$ = 5 mW |
| Deep Sleep to Listen | $T_{SDL}$ = 10 ms | |

If STA (hereinafter, referred to as HE STA) for supporting HE PPDU has received Intra-BSS PPDU (e.g., non-HT, HT, VHT or HE PPDU) and the received Intra-BSS PPDU is not intended for the corresponding STA, the HE STA may reduce power consumption by shifting to a doze state.

Intra PPDU PS Operation for HE PPDU

If STA (hereinafter, referred to as HE STA) for supporting HE PPDU has received Intra-BSS HE PPDU and the received Intra-BSS PPDU is not intended for the corresponding HE STA, the HE STA may reduce power consumption by shifting to a doze state. At this time, the HE STA may use BSS color information included in HE-SIG A to determine whether the HE PPDU is Intra-BSS PPDU.

In detail, as a case that (i) the HE STA receives HE DL MU PPDU (UL FLAG=0), if BSS color information of the corresponding PPDU is identical with color information of BSS with which the HE STA is associated and identifier or broadcast/multicast identifier of the corresponding STA is not included in HE-SIG B, the HE STA may enter the doze state until the end of HE DL MU PPDU. As a case that (ii) the HE STA receives HE UL MU PPDU (UL FLAG=1), if BSS color information of the corresponding PPDU is identical with color information of the BSS with which the HE STA is associated, the HE STA may enter the doze state until the end of HE UL MU PPDU. As a case that (iii) the HE STA receives HE SU PPDU, if BSS color information of the corresponding PPDU is identical with color information of BSS with which the HE STA is associated and UL/DL indicator indicates UL, the HE STA may enter the doze state until the end of HE SU PPDU.

Intra PPDU PS Operation for PPDU that Includes A-MPDU

Hereinafter, PS mode operation of STA in an advanced wireless LAN system (e.g., 802.11ax), for example, a method for allowing HE-STA to enter a sleep mode (e.g., micro sleep mode) after receiving A-MPUD (e.g., legacy A-MPDU) will be described.

It is assumed that the STA decodes any one of MPDUs included in A-MPDU after receiving PPDU that includes A-MPDU. If the received frame is the frame (e.g., Intra-BSS/myBSS frame) transmitted from STA (e.g., AP or non-AP STA) which belongs to the same BSS as that of the corresponding STA and is not the frame transmitted to the corresponding STA, the corresponding STA may enter a doze state (e.g., shallow sleep mode or micro sleep mode) until the end of the corresponding PPDU.

For example, if at least one of address fields (e.g., A1/A2 field included in MAC header) is identical with ID/Address (e.g., BSSID) of BSS to which the STA belongs, the STA may determine that the corresponding frame is Intra-BSS frame.

If A1 field is not identical with MAC address (or any one of AIDs allocated to STA) of the STA and/or is identical with Broadcast address/multicast address(es), the STA may determine that the corresponding frame is not the frame transmitted thereto. In this case, the STA may determine that the STA is not a receiver intended for the frame.

In this case, the STA enters the doze state until the end of a duration of remaining PPDU after decoding a specific MPDU (e.g., first MPDU). For example, the STA may identify whether the received frame is intra-BSS frame and intends the STA as a receiver, by decoding a specific MPDU (e.g., leading MPDU of A-MPDUs). If the received frame is intra-BSS frame and the corresponding STA is not an intended receiver, the corresponding STA may enter the doze state until the end of the corresponding frame (that is, the end of the corresponding PPDU) without decoding the other MPDUs included in A-MPDU.

Figure 21:
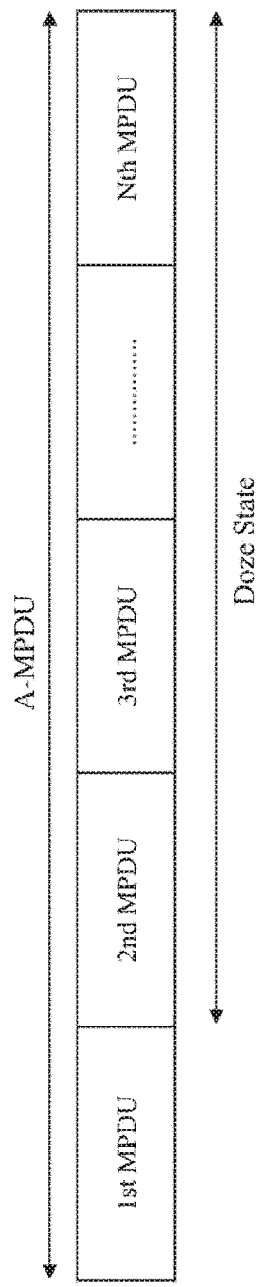
FIG. 21 illustrates A-MPDU for PS operation according to one embodiment of the present invention.

FIG. 21 illustrates A-MPDU for PS operation according to one embodiment of the present invention.

It is assumed that the STA has received PPDU that includes A-MPDU as shown in FIG. 21.

When the STA receives the first MPDU, BSSID of the AP with which the STA is associated is included in an address field of the first MPDU and Receiver Address (e.g., A1) is not identical with MAC address of the STA, the STA may enter the doze state for the remaining PPDU duration. As described above, the Receiver Address (e.g., A1) should not be a Group address (e.g., Broadcast address/Multicast address).

Meanwhile, in addition to the case that the STA receives the first MPDU, if the following conditions are satisfied, it may be defined that the PS operation is performed.

When the STA decodes/receives MPDU that includes information for determining BSSID of the AP with which the STA is associated or MAC header for determining that the STA is not a receiver, if BSSID of the AP with which the STA is associated is included in MPDU, the STA may enter the doze state.

When the STA successfully decodes MPDU that includes A1 field (e.g., Receiver Address) and A2 field (e.g., Transmitter Address) in A-MPDU, if one of the A1 field and the A2 field is identical with BSSID of the BSS to which the STA belongs and the other one is not identical with MAC address of the STA, the STA may enter the doze state until the end of the PPDU. For example, in FIG. 21, if any one address (e.g., one of A1 and A2 fields) includes BSSID of BSS to which the STA belongs and the other one address (e.g., the other one of A1 and A2) does not include MAC address of the STA, the STA may enter the doze state until the remaining PPDU duration (that is, the end of the corresponding PPDU).

Such an operation of the PS mode may efficiently reduce unnecessary power consumption of the STA when many MPDUs are included in A-MPDU.

The aforementioned first MPDU may be interpreted to indicate the first MPDU successfully decoded within A-MPDU. Therefore, if the STA fails to decode MPDU 1 located at the forefront in A-MPDU and successfully decodes MPDU 2 next to MPDU 1, MPDU 2 may be regarded as the first MPDU. The STA may use address fields of the MPDU2, and if the MPDU 2 includes an address identical with BSSID of its AP and the other address does not indicate MAC address of the STA, the STA may enter the doze state the until the end of the remaining PPDU.

In FIG. 21, to transmit the A-MPDU to the PPDU, a PLCP header referred to as PHY header is attached prior to the A-MPDU. In case of Non-HT (non-HT Duplicated) PPDU, L-STF, L-LTF, and L-SIG field are included in the PLCP header. In case of HT PPDU, in addition to L-STF, L-LTF, and L-SIG, one or more of HT-STF, HT-LTF, and HT-SIG may be attached. Also, in case of VHT PPDU, in addition to L-STF, L-LTF, and L-SIG, one or more of VHT-STF, VHT-LTF, and VHT-SIG A/B may be attached.

In the above example, the end of the A-MPDU is the end of the PPDU. If the aforementioned Intra PPDU PS mode is applied to the A-MPDU included in the HE PPDU, the end of the PPDU may not be identical with the end of the A-MPDU. For example, if another data further exist after the A-MPDU in the PPDU, the end of the PPDU may be located later than the end of the A-MPDU. For example, FIG. 21 illustrates the operation of the Intra-PPDU PS based on information of the A-MPDU, wherein the exact end of the PPDU may mean the end of the PPDU defined in the standard document. For example, with respect to the VHT PPDU or the HE PPDU, the STA may know the end of the PPDU through a Length field of L-SIG.

Intra PPDU PS Operation for VHT PPDU

Next, a method for reducing power consumption of STA when VHT-PPDU is received will be suggested.

When the STA successfully decode VHT-SIG A after receiving VHT PPDU, if a corresponding PPDU is a frame transmitted from another STA, which belongs to BSS, to an AP accessed by the corresponding STA, the corresponding STA may enter the doze state for the remaining PPDU duration until the end of the corresponding PPDU, whereby power consumption may be reduced.

To determine whether the above condition is satisfied, the STA which has received VHT-SIG-A should identify PPDU transmitted from another STA, which belongs to the same BSS as that of the corresponding STA, to an AP accessed by the corresponding STA.

In case of non-AP STA, when receiving VHT UL PPDU, the non-AP STA may know the received VHT UL PPDU. For example, as result of decoding of VHT-SIG A through the non-AP STA, if Group ID is set to 0 in VHT-SIG A and partial AID is identical with a part (i.e., BSSID[39.47]) of BSSID of BSS to which the STA belongs, the STA may determine that the corresponding VHT PPDU is transmitted to UL by another STA of BSS to which the STA belongs, and then may enter the doze state until the end of the corresponding PPDU.

Figure 22:
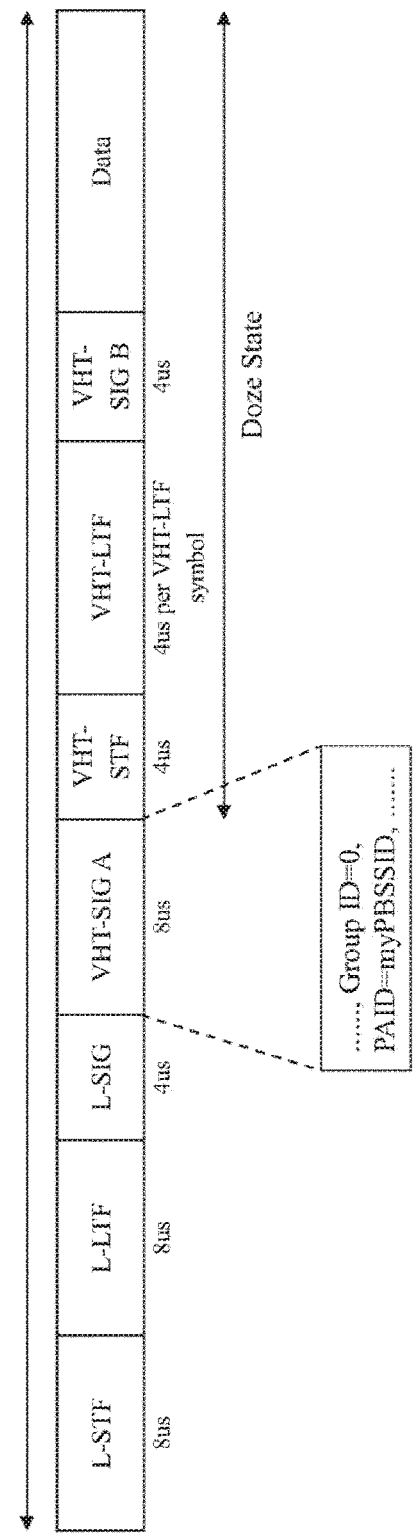
FIG. 22 illustrates VHT-SIG A for PS operation according to one embodiment of the present invention.

FIG. 22 illustrates VHT-SIG A for PS operation according to one embodiment of the present invention.

In FIG. 22, the STA decodes VHT-SIG A. As a result of decoding of VHT-SIG A, since Group ID is set to 0 and PAID has a value identical with BSSID[39:47] of BSS, the STA enters the doze state until the end of the VHT PPDU.

HE non-AP STA in an intra-PPDU power save mode may enter a doze state until the end of the received PPDU,
  if the PPDU is VHT PPDU,
  RXVECTOR parameter GROUP_ID is 0, and
  RXVECTOR parameter PARTIAL_AID is identical with BSSID[39:47] of BSS with which the STA is associated.

If the HE STA in the intra-PPDU power save mode enters the doze state, the HE STA should continue to operate a NAV timer at the doze state, and should switch the end of the PPDU to an awake state.

Since GID=0 means UL in the HT PPDU, the Intra-PPDU PS operation of the STA may be regarded as an operation of the STA (e.g., HE STA) which has received UL VHT PPDU. Therefore, if UL VHT PPDU is received, the HE non-AP STA may enter the doze state for the remaining PPDU duration after decoding VHT signal field.

Meanwhile, the aforementioned 'VHT TXOP PS' is operated in a PS mode without considering Intra-BSS/Inter-BSS.

For example, in case of VHT-PPDU based Intra-BSS PS operation suggested in this embodiment, the STA considers whether the frame is Intra-BSS/Inter-BSS (e.g., BSSID[39:47]). Although the corresponding PPDU is Intra-BSS VHT PPDU, if the STA is not a receiver of the corresponding VHT PPDU (e.g., GID=0 based UL VHT PPDU), the STA enters the doze state until the end of the VHT PPDU.

On the other hand, since Intra-BSS/Inter-BSS is not considered in case of the aforementioned 'VHT TXOP PS', an error operation may occur in which the STA enters the doze state by means of BSS (e.g., OBSS) frame to which the STA does not belong. That is, since the STA does not consider whether an entity that has transmitted the frame is AP of BSS to which the STA belongs, it may not be proper to use VHT TXOP PS in a dense environment such as 11ax. Also, in case of VHT TXOP PS, it is not defined that the STA enters the doze state with respect to UL VHT. Also, in case of VHT TXOP PS, there is a difference in that the time when the STA enters the doze state is TXOP duration not a duration of the corresponding PPDU.

The duration of the PPDU should be identified from TXOP duration (or MAC duration) indicated by a duration field of the corresponding PPDU. The duration of the PPDU means an actual length of the corresponding PPDU, and for example, may be identified by a PHY preamble. Unlike this example, the TXOP duration is a length of TXOP desired by TXOP holder/responder to be reported, and is determined considering multi-frame exchange between the TXOP holder/responder. In detail, it is assumed that the TXOP holder transmits a first PPDU, TXOP transmits a second PPDU in response to the first PPDU, and the TXOP holder transmits ACK for the second PPDU. In this example, a duration value (or duration value indicated by the TXOP duration field of SIG-A) indicated by a duration field of MAC header of the first PPDU is determined considering transmission and reception of all of the first PPDU, the second PPDU and ACK. On the contrary, the duration of the first PPDU means a size of the first PPDU on a time domain.

The aforementioned method may be applied to, but not limited to, HT PPDU and VHT DL PPDU, which can carry the A-MPDU.

For example, if any one of the followings (a) to (g) is satisfied, the HE non-AP STA in the intra-PPDU power save mode may enter the doze state until the end of the received PPDU, and is not limited to this case.

(a) The PPDU is VHT PPDU, and
the case that a value of RXVECTOR parameter GROUP_ID is 63,
a value of RXVECTOR parameter PARTIAL_AID is not included in PARTIAL_AID_LIST_GID63 (i.e., PAID field of VHT-SIG-A is not identical with values of a list of PAIDs allocated to the STA), and
the STA normally decodes MPDU included in A-MPDU subframe of which EOF is set to 0, and the A-MPDU includes BSSID of BSS with which the STA is associated.

(b) The PPDU is VHT PPDU, and
the case that a value of RXVECTOR parameter GROUP_ID is 63,
a value of RXVECTOR parameter PARTIAL_AID is included in PARTIAL_AID_LIST_GID63 (i.e., PAID field of VHT-SIG-A is identical with values of a list of PAIDs allocated to the STA), and
the STA normally decodes MPDU included in A-MPDU subframe of which EOF is set to 0, and the A-MPDU includes any one address field (e.g., either A1 or A2 field) identical with BSSID of BSS with which the STA is associated, and the other one address field (e.g., either A1 or A2 field) is not identical with any of MAC address, broadcast address and multicast address of the STA.

(c) The PPDU is VHT PPDU, and
the case that a value of RXVECTOR parameter GROUP_ID is not 63 or 0, and
the STA normally decodes MPDU included in A-MPDU subframe of which EOF is set to 0, and the A-MPDU includes any one address field (e.g., either A1 or A2 field) identical with BSSID of BSS with which the STA is associated, and the other one address field (e.g., either A1 or A2 field) is not identical with any of MAC address, broadcast address and multicast address of the STA.

(d) The PPDU is VHT PPDU, and
the case that a value of RXVECTOR parameter GROUP_ID is not 63 or 0, and
the STA normally decodes MPDU, and the MPDU includes any one address field (e.g., either A1 or A2 field) identical with BSSID of BSS with which the STA is associated, and the other one address field (e.g., either A1 or A2 field) is not identical with any of MAC address, broadcast address and multicast address of the STA.

(e) The PPDU is HT PPDU, and
the case that a value of RXVECTOR parameter AGGREGATION indicates AGGREGATED, and
the STA normally decodes MPDU, and the MPDU includes any one address field (e.g., either A1 or A2 field) identical with BSSID of BSS with which the STA is associated, and the other one address field (e.g., either A1 or A2 field) is not identical with any of MAC address, broadcast address and multicast address of the STA.

(f) The PPDU is VHT PPDU or HT PPDU, and
the case that A-MPDU frame includes a plurality of A-MPDU subframes, and
MPDU of A-MPDU subframe includes any one address field (e.g., either A1 or A2 field) identical with BSSID of BSS with which the STA is associated, and the other one address field (e.g., either A1 or A2 field) is not identical with any of MAC address, broadcast address and multicast address of the STA.

(g) The PPDU is non-HT PPDU, HT PPDU or VHT PPDU, and the case that MPDU of PPDU includes any one address field (e.g., either A1 or A2 field) identical with BSSID of BSS with which the STA is associated, and the other one address field (e.g., either A1 or A2 field) is not identical with any of MAC address, broadcast address and multicast address of the STA.

In the above examples, the PS operation method for Intra-BSS PPDU in which A-MPDU is included has been mainly described but the scope of the present invention is not limited to A-MPDU. The above-described methods may be applied to PPDU in which single MPDU is included. For example, when the STA receives PPDU and decodes MPDU, and when it is determined that the corresponding PPDU is Intra-BSS PPDU (i.e., BSSID of the STA is not included) on the basis of address/ID information included in MPDU and the received PPDU is not transmitted to the corresponding STA (i.e., when RA field is not identical with MAC address of the corresponding STA, allocated AIDS, and Broadcast/Multicast Address), the STA may enter the doze state for the remaining duration of the corresponding PPDU.

Meanwhile, when long padding behind MPDU is attached to MPDU, the aforementioned PS operation may be applied to PPDU in which MPDU is only included.

PPDU to which the aforementioned Intra PPDU PS operation is applied may not be limited to a specific PPDU type. Preferably, the intra PPDU PS operation may be applied to all of VHT PPDU, HT PPDU, and Non-HT PPDU. Also, the intra PPDU PS operation may equally be applied to HE PPDU.

Also, as described above, the power saving effect is great when the Intra PPDU PS operation is applied to PPDU in which A-MPDU is included.

Figure 23:
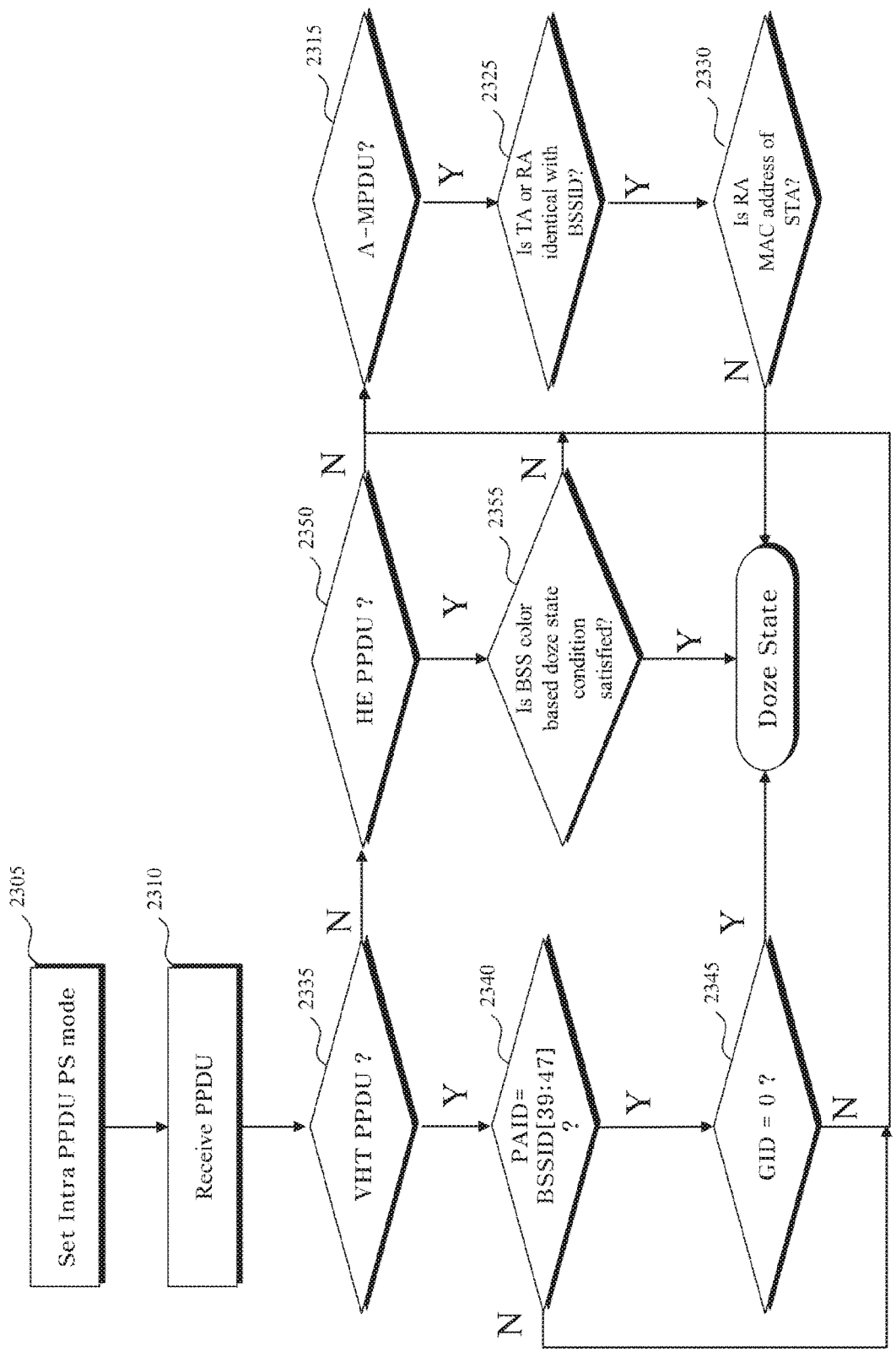
FIG. 23 illustrates an operation method of PS mode according to one embodiment of the present invention.

FIG. 23 illustrates an operation method of PS mode according to one embodiment of the present invention based on the aforementioned discussion. Repeated description of the aforementioned description will be omitted. The embodiment of FIG. 23 does not restrict the scope of the present invention. For convenience of description, it is assumed that an entity for performing the PS mode operation of FIG. 23 is HE-non AP STA. However, the present invention is not limited to this assumption, and the entity may be applied to another STA or AP.

First of all, the STA enables an Intra-PPDU PS mode (2305). Afterwards, the STA receives PPDU (2310). The PPDU received by the STA may be one of, but not limited to, HE PPDU, VHT PPDU, HT PPDU and non-HT PPDU.

Although the process of determining whether the STA is VHT PPDU is first shown in FIG. 23, this is for convenience of description, and the STA may identify whether a format of the received PPDU is non-HT/HT/VHT/HE PPDU by decoding a PHY header. The PHY header (or PHY preamble) is attached prior to MAC frame or NDP (null data packet) frame, which includes MPDU or A-MPDU, and the STA may identify whether the received PPDU is HE PPDU as well as whether the received PPDU is VHT PPDU, by decoding the PHY header. Meanwhile, as described above, the STA should first decode the PHY header prior to decoding of the MAC frame.

Also, the Intra PPDU PS mode operation for A-MPDU may be applied without restriction in a format of the PPDU. For example, the aforementioned conditions for entering the doze state with respect to the A-MPDU may be applied to all of non-HT/HT/VHT/HE PPDU.

Therefore, even though the doze mode conditions 2340 and 2345 specific to VHT PPDU and the doze mode condition 2355 specific to HE PPDU are not satisfied, the STA may check whether the corresponding PPDU satisfies the doze mode condition for the A-MPDU.

For convenience of description, if the PPDU is HE PPDU (e.g., HE MU PPDU, HE SU PPDU, HE extended range SU PPDU, HE trigger based PPDU) (2350), the Intra PPDU PS mode operation of the STA will briefly be described. If the PPDU is the HE PPDU, the STA may use BSS color information to determine whether to enter the doze state until the end of the HE PPDU (2355). For example, the STA may determine whether the HE PPDU is Intra-BSS PPDU depending on whether BSS color information included in the HE-SIG A field of the HE PPDU is identical with color information of BSS to which the STA belongs.

In more detail, (i) if the PPDU is HE MU PPDU, RXVECTOR parameter BSS color is identical with BSS color of BSS with which the STA is associated, RXVECTOR parameter UL_FLAG is 0, and RXVECTOR parameter STA_ID_LIST does not include identifier of the STA or broadcast identifier, the STA may enter the doze state until the end of the HE MU PPDU. (ii) If the PPDU is HE MU PPDU, HE SU PPDU or HE extended range SU PPDU, RXVECTOR parameter BSS_COLOR is identical with BSS color of BSS with which the STA is associated, and RXVECTOR parameter UL_FLAG is 1, the STA may enter the doze state until the end of the corresponding PPDU. Also, if the PPDU is HE MU PPDU, HE SU PPDU or HE extended range SU PPDU, RXVECTOR parameter BSS_COLOR is identical with BSS color of BSS with which the STA is associated, RXVECTOR parameter UL_FLAG is 0, and PHY-RXEND.indication(UnsupportedRate) primitive is received, the STA may enter the doze state until the end of the corresponding PPDU. (iii) If the PPDU is HE trigger-based PPDU, and RXVECTOR parameter BSS color is identical with BSS color of BSS with which the STA is associated, the STA may enter the doze state until the end of the HE trigger-based PPDU.

Meanwhile, if the received PPDU is VHT PPDU (2335), the STA checks whether RXVECTOR parameter PARTIAL_AID (e.g., PAID included in VHT-SIG A) is identical with BSSID[39:47] of BSS with which the STA is associated (2340).

If RXVECTOR parameter PARTIAL_AID is identical with BSSID[39:47], the STA checks whether RXVECTOR parameter Group_ID (e.g., GID included in VHT-SIG A) is 0 (2340). Therefore, the STA may identify whether the corresponding VHT PPDU is UL Intra BSS PPDU. In case of GID=0, the STA may enter the doze state until the end of the VHT PPDU. For example, the STA may enter the doze state for the remaining PPDU duration after decoding VHT SIG A field. In this embodiment of the PPDU, although it is assumed that the step 2340 is performed after the step 2345, this assumption is for convenience of description, and the steps 2340 and 2345 are intended to check the VHT SIG A field. Therefore, the steps 2340 and 2345 may be performed at the same time, or the step 2345 may be performed prior to the step 2340.

Meanwhile, the STA identifies whether the received PPDU includes A-MPDU (2315). If the A-MPDU is included in the PPDU, the STA determines whether RA field or TA field included in the A-MPDU is identical with BSSID of BSs to which the STA belongs (2325). For example, STA may decode at least one of a plurality of MPDUs included in the A-MPDU to identify MAC header of the decoded MPDU. The STA may determine whether RA or TA is identical with BSSID through A1/A2 field included in the MAC header.

If RA field or TA field included in the A-MPDU is identical with BSSID of BSs to which the STA belongs, the STA determines whether RA is identical with MAC address of the STA (2330). If RA is not identical with MAC address of the STA, the STA may enter the doze state until the end of the PPDU. In other words, the STA may determine that it is not an intended receiver although the corresponding PPDU is Intra-BSS PPDU, and may enter the doze state until the end of the PPDU. In this example, although it is assumed that the step 2330 is performed after the step 2325, this assumption is for convenience of description, and the steps 2330 and 2325 are intended to check the A1/A2 field. Therefore, the steps 2330 and 2325 may be performed at the same time, or the step 2330 may be performed prior to the step 2325.

If the STA in the Intra-PPDU PS mode cannot enter the doze state, the STA may maintain the awake state.

If the STA in the Intra-PPDU PS mode enters the doze state, the STA should continue to operate the NAV timer and also consider whether media are congested for the doze state. Also, the STA should switch the PPDU from the end to the awake state.

Figure 24:
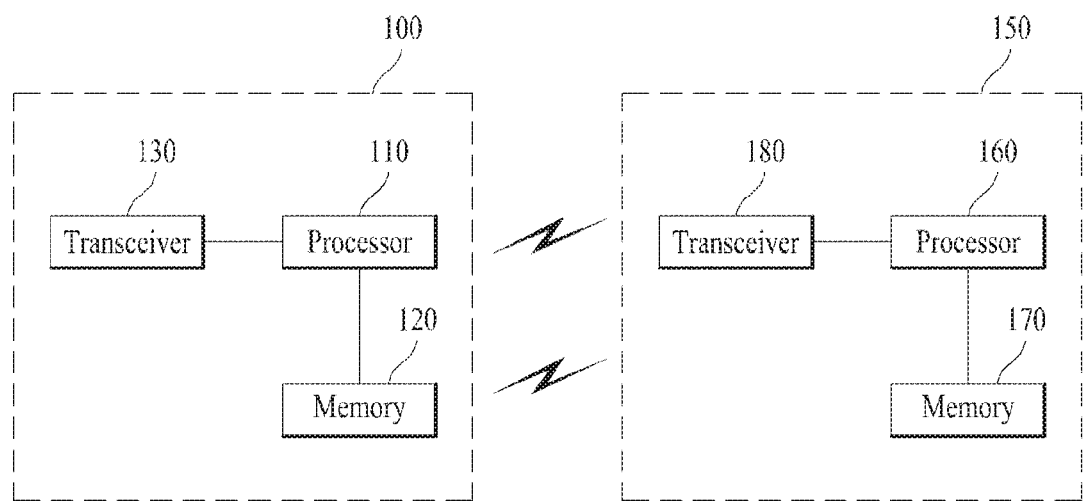
FIG. 24 is a diagram illustrating an apparatus according to one embodiment of the present invention.

FIG. 24 illustrates devices for implementing the aforementioned methods.

A wireless device 100 and a wireless device 150 in FIG. 24 may correspond to the aforementioned specific STA and AP, respectively.

The STA 100 may include a processor 110, a memory 120, and a transceiver 130 and the AP 150 may include a processor 160, a memory 170, and a transceiver 160. The transceivers 130 and 180 may transmit/receive a wireless signal and may be implemented in a physical layer of IEEE 802.11/3GPP. The processors 110 and 160 are implemented in a physical layer and/or a MAC layer and are connected to the transceivers 130 and 180. The processors 110 and 160 may perform the above-described UL MU scheduling procedure.

The processors 110 and 160 and/or the transceivers 130 and 180 may include an Application-Specific Integrated Circuit (ASIC), a chipset, a logical circuit, and/or a data processor. The memories 120 and 170 may include a Read-Only Memory (ROM), a Random Access Memory (RAM), a flash memory, a memory card, a storage medium, and/or a storage unit. If an example is performed by software, the above-described method may be executed in the form of a module (e.g., a process or a function) performing the above-described function. The module may be stored in the memories 120 and 170 and executed by the processors 110 and 160. The memories 120 and 170 may be located at the interior or exterior of the processors 110 and 160 and may be connected to the processors 110 and 160 via known means.

The detailed description of the preferred examples of the present invention has been given to enable those skilled in the art to implement and practice the invention. Although the invention has been described with reference to the preferred examples, those skilled in the art will appreciate that various modifications and variations can be made in the present invention without departing from the spirit or scope of the invention described in the appended claims. Accordingly, the invention should not be limited to the specific examples described herein, but should be accorded the broadest scope consistent with the principles and novel features disclosed herein.

INDUSTRIAL APPLICABILITY

The present invention can be applied to various wireless communication systems including IEEE 802.11 wireless LAN systems.

What is claimed is:

1. A method for a station (STA) operating in a power-save (PS) mode in a wireless local area network (LAN) system, the method comprising:
   receiving a physical layer protocol data unit (PPDU);
   decoding at least a part of the PPDU; and
   operating in a doze state until an end of the PPDU based on a result of the decoding satisfying a set of predetermined conditions,
   wherein the set of predetermined conditions comprise a condition that:
      the PPDU includes an aggregate-Medium Access Control (MAC) protocol data unit (A-MPDU),
      a transmitter address (TA) field or a receiver address (RA) field included in the A-MPDU includes a same address as a basic service set (BSS) ID associated with the STA, and
      the RA field includes an address that does not match a MAC ID of the STA.

2. The method according to claim 1, wherein the STA continues to operate a network allocation vector (NAV) timer while the STA is operating in the doze state, and is switched to an awake state at the end of the PPDU.

3. The method according to claim 1, wherein the RA and the TA are included in the MAC header of each of a plurality of MPDUs included in the A-MPDU.

4. The method according to claim 3, wherein the STA identifies the RA and the TA included in the A-MPDU by decoding any one of the plurality of MPDUs.

5. The method according to claim 4, wherein the STA decodes a MPDU located at a forefront among the plurality of MPDUs, and operates in the doze state for a duration of the other MPDUs.

6. A station (STA) operating in a power save (PS) mode in a wireless local area network (LAN) system, the STA comprising:
   a receiver for receiving a physical layer protocol data unit (PPDU); and
   a processor for decoding at least a part of the PPDU and controlling the STA to operate in a doze state until an end of the PPDU based on a result of the decoding satisfying a set of predetermined conditions,
   wherein the set of predetermined conditions comprise a condition that:
      the PPDU includes an aggregate-Medium Access Control (MAC) protocol data unit (A-MPDU),
      a transmitter address (TA) field or a receiver address (RA) field included in the A-MPDU includes a same address as a basic service set (BSS) ID associated with the STA, and
      the RA field includes an address that does not match a MAC ID of the STA.

7. The STA according to claim 6, wherein the processor continues to operate a network allocation vector (NAV) timer while the STA is operating in the doze state, and is switched to an awake state at the end of the PPDU.

8. The STA according to claim 6, wherein the RA and the TA are included in the MAC header of each of a plurality of MPDUs included in the A-MPDU.

9. The STA according to claim 8, wherein the processor identifies the RA and the TA included in the A-MPDU by decoding any one of the plurality of MPDUs.

10. The STA according to claim 9, wherein the processor decodes a MPDU located at a forefront among the plurality of MPDUs, and operates in the doze state for a duration of the other MPDUs.

* * * * *